US012617569B2

(12) United States Patent　　　　(10) Patent No.:　US 12,617,569 B2
Brinckmann et al.　　　　　　　　　(45) Date of Patent:　　May 5, 2026

(54) PRIMARY PACKAGING LINE FOR OPHTHALMIC ARTICLES

(71) Applicant: Alcon Inc., Fribourg (CH)

(72) Inventors: Felix Brinckmann, Roßdorf (DE); Nils Schweizer, Bad König (DE)

(73) Assignee: Alcon Inc., Fribourg (CH)

( * ) Notice: Subject to any disclaimer, the term of this patent is extended or adjusted under 35 U.S.C. 154(b) by 0 days.

(21) Appl. No.: 19/035,215

(22) Filed: Jan. 23, 2025

(65) Prior Publication Data

US 2025/0242956 A1　　　Jul. 31, 2025

Related U.S. Application Data

(60) Provisional application No. 63/624,953, filed on Jan. 25, 2024.

(51) Int. Cl.
| | |
|---|---|
| *B65B 25/00* | (2006.01) |
| *B65B 7/16* | (2006.01) |
| *B65B 35/16* | (2006.01) |
| *B65B 35/18* | (2006.01) |
| *B65B 35/24* | (2006.01) |
| *B65B 35/40* | (2006.01) |
| *B65B 43/54* | (2006.01) |
| *B65B 43/56* | (2006.01) |
| *B65B 57/10* | (2006.01) |
| *B65B 59/00* | (2006.01) |

(Continued)

(52) U.S. Cl.
CPC ............ *B65B 25/008* (2013.01); *B65B 7/164* (2013.01); *B65B 35/16* (2013.01); *B65B 35/18* (2013.01); *B65B 35/405* (2013.01); *B65B 43/54* (2013.01); *B65B 43/56* (2013.01); *B65B*

*57/10* (2013.01); *B65B 59/001* (2019.05); *B65B 61/26* (2013.01); *B65B 65/003* (2013.01); *B65B 35/24* (2013.01); *B65G 35/08* (2013.01)

(58) Field of Classification Search
CPC ....... B65B 7/164; B65B 25/008; B65B 35/16; B65B 35/18; B65B 35/24; B65B 35/405; B65B 43/54; B65B 43/56; B65B 57/10; B65B 59/001; B65B 61/26; B65B 65/003; B65G 35/08
USPC ...... 53/431, 111 R, 167, 53, 282, 131.3, 239
See application file for complete search history.

(56) References Cited

U.S. PATENT DOCUMENTS

| | | | | | |
|---|---|---|---|---|---|
| 4,972,937 | A | * | 11/1990 | Aarts ..................... | B65G 35/08 |
| | | | | | 198/795 |
| 5,528,878 | A | * | 6/1996 | Edwards et al. ...... | B65B 25/008 |
| | | | | | 53/54 |

(Continued)

FOREIGN PATENT DOCUMENTS

| | | | |
|---|---|---|---|
| IT | 201800009469 | A1 | 4/2020 |
| KR | 20220163735 | A | 12/2022 |

*Primary Examiner* — Anna K Kinsaul
(74) *Attorney, Agent, or Firm* — Sheng-Hsin Hu

(57) ABSTRACT

A Primary Packaging Line using a single carrier tray concept allows to have a lean setup of the lens transfer/ripping process from the upstream Inspection Module, blister strip formation after the inspection and a shell reusage system in case of detected missing or multiple lenses by the inspection. The primary packaging line for packaging ophthalmic articles comprises: shell supply and placement station; saline pre-dosing station; lens transfer station; saline main dosing station; lens presence check station; lens and shell reject station; lot sorter station; foil supply and sealing station and blister labeling station.

15 Claims, 20 Drawing Sheets

(51) Int. Cl.
    *B65B 61/26*         (2006.01)
    *B65B 65/00*         (2006.01)
    *B65G 35/08*         (2006.01)

(56)            References Cited

U.S. PATENT DOCUMENTS

| | | | |
|---|---|---|---|
| 5,561,970 A | | 10/1996 | Edie |
| 5,568,715 A | * | 10/1996 | Ebel et al. ............ B65B 25/008 |
| | | | 53/494 |
| 5,745,230 A | * | 4/1998 | Edwards et al. ... G01M 11/0207 |
| | | | 356/124 |
| 2019/0064541 A1 | * | 2/2019 | Biel et al. ................ G02C 7/04 |
| 2024/0317445 A1 | * | 9/2024 | Gianese et al. ......... B65B 57/14 |

\* cited by examiner

PRIMARY PACKAGING LINE FOR OPHTHALMIC ARTICLES

FIELD

The present invention generally relates to packaging of ophthalmic articles, and more particularly relates to a primary packaging line for ophthalmic articles, for example ophthalmic lenses, in particular contact lenses such as soft contact lenses.

BACKGROUND

In the automated manufacture of ophthalmic articles, for example ophthalmic lenses, and in particular contact lenses such as soft contact lenses, these articles or lenses are manufactured and subsequently automatically inspected for possible defects. For example, in the automated manufacture of soft contact lenses inspection of the lenses may be automatically performed in inspection cuvettes. Those lenses that have successfully passed inspection are then transferred from the cuvettes into the cavities of a primary packaging shell arranged in a primary packaging line, one lens into one cavity of one primary packaging shell. Transfer of a said successfully inspected lens from the inspection cuvette into the cavity of a said primary packaging shell is typically performed with the aid of a transfer gripper. To simplify placement of the lens adhered to the gripper into the cavity of the primary packaging shell, an initial small amount of storage liquid, e.g. saline, is pre-dosed into the cavity of the primary packaging shell prior to the lens being placed into the cavity. After the lens is placed into the cavity, in a subsequent step the main amount of storage solution, e.g. saline, is dosed into the cavity of the primary packaging shell, and finally a foil is sealed to the top surface of the primary packaging shell. However, before sealing the foil to the top surface of the primary packaging shell, a lens presence check is performed in order to determine that actually only one lens is contained in the cavity. Thereafter, the foil is sealed to the top surface of the primary packaging shell. Typically, a predetermined number of primary packaging shells, for example three or five, are commonly arranged on a shell carrier, and a corresponding number of individual foils which are connected to one another to form a foil strip, are placed onto the top surfaces of the primary packaging shells arranged on the shell carrier and sealed thereto to form a blister strip of three or five blister packages each containing a said lens and the storage solution.

And even though this works well, there may be occurrences in which either no lens is actually placed into the cavity or more than one lens is actually placed into the cavity. For example, the lens may not be properly gripped by the gripper from the inspection cuvette or may inadvertently get lost from the gripper during the transfer so that no lens is actually placed into the cavity of the primary packaging shell. Alternatively, the lens may not get properly released from the gripper and placed in the cavity of the primary packaging shell so that the lens continues to adhere to the gripper at the time the next lens is gripped from the inspection cuvette by the same gripper so that subsequently two lenses may adhere to the gripper and may be placed into the cavity of the primary packaging shell. In either case, the result is that the cavity of the primary packaging shell does not contain one single lens. The afore-mentioned occurrences are, however, detected during the lens presence check. In case such occurrence (i.e. either no lens or more than one lens in the cavity) is detected during the lens presence check, the whole blister strip must be discarded after the sealing step, although only one primary packaging shell of the blister strip may actually contain a number of lenses different from one. Obviously, this has a negative effect on the yield.

SUMMARY OF THE INVENTION

The present invention overcomes the disadvantages discussed above by suggesting a primary packaging line as it is specified by the features of the independent claim. Further aspects of the primary packaging line according to the invention are the subject of the dependent claims.

More particularly, in accordance with the invention a primary packaging line for packaging ophthalmic articles, for example ophthalmic lenses, in particular contact lenses such as soft contact lenses is suggested. The primary packaging line comprises:

a plurality of individual single shell carriers, each individual single shell carrier configured to carry a single primary packaging shell;

a supply belt configured to transport those individual single shell carriers arranged thereon in a first transportation direction to a downstream end of the supply belt;

a primary packaging shell placement robot arranged along the supply belt and configured to place a said single primary packaging shell on a said individual single shell carrier arranged on the supply belt, so that a primary packaging shell is arranged on each single shell carrier at the downstream end of the supply belt;

a cyclically and intermittently movable singling conveyor belt arranged at the downstream end of the supply belt and extending in a direction transverse to the supply belt, the singling conveyor belt configured to receive thereon during an actual cycle the single shell carrier which is arranged at the downstream end of the supply belt, and further configured to intermittently transport that single shell carrier as well as those single shell carriers received during preceding cycles in a second transportation direction transverse to the first transportation direction towards a downstream end of the singling conveyor belt;

a guiding rail arranged at the downstream end of the singling conveyor belt and extending in a direction transverse to the singling conveyor belt, the guiding rail configured to receive during the respective actual cycle of the singling conveyor belt that single shell carrier which is arranged at the downstream end of the singling conveyor belt, and further configured to guide the received single shell carrier along the guiding rail in a third transportation direction transverse to the second transportation direction;

a pusher arranged at the downstream end of the singling shell conveyor belt, the pusher configured to push that single shell carrier that is arranged at the downstream end of the singling conveyor belt on the guiding rail during the respective actual cycle of the singling conveyor belt, thereby moving those single shell carriers pushed on the guiding rail during preceding cycles in the third transportation direction along the guiding rail;

an ophthalmic article placement robot arranged along the guiding rail and configured to place an ophthalmic article into a cavity of the primary packaging shell arranged on the respective single shell carrier;

an ophthalmic article presence check unit arranged along the guiding rail downstream of the ophthalmic article placement robot and configured to determine the number of ophthalmic articles present in the cavity of the primary packaging shell arranged on the respective single shell carrier;

a shell carrier ejector arranged along the guiding rail downstream of the ophthalmic article presence check unit and configured to eject from the guiding rail a single shell carrier with a primary packaging shell arranged thereon that has been determined by the ophthalmic article presence check unit to contain in its cavity a number of ophthalmic articles different from one;

a lot sorter arranged along the guiding rail downstream of the shell carrier ejector and laterally relative to the guiding rail, the lot sorter configured to receive and store the single shell carriers arriving at the lot sorter each carrying a primary packaging shell containing one ophthalmic article in its cavity, the lot sorter comprising a number of sorter compartments which is at least as high as the number of different lots of ophthalmic articles to be placed by the ophthalmic article placement robot into the cavities of the primary packaging shells, the lot sorter further configured to receive and store in each sorter compartment only single shell carriers all carrying a said primary packaging shell containing in its cavity one ophthalmic article of the same lot, the lot sorter further configured to push all single shell carriers stored in the respective sorter compartment out of the respective sorter compartment back on the guiding rail when a predetermined number of single shell carriers is contained in the respective sorter compartment and once a said single shell carrier with a said primary packaging shell containing in its cavity an ophthalmic article of the same lot is expected to arrive at the lot sorter;

a shell carrier block transportation mechanism arranged at the lot sorter beneath the guiding rail, the shell carrier block transportation mechanism configured to engage a shell carrier block which is formed by the predetermined number of single shell carriers pushed out of the lot sorter compartment on the guiding rail and the next shell carrier arriving at the lot sorter, the shell carrier block transportation mechanism further configured to move the shell carrier block on a discharge track extending downstream of the lot sorter in the third transportation direction;

a sealing device arranged along the discharge track, the sealing device configured to supply a sealing foil strip comprising a number of individual sealing foils connected to one another to form the sealing foil strip, the number of individual sealing foils of the sealing foil strip corresponding to the number of single shell carriers of the shell carrier block, the sealing device further configured to seal the individual foils of the sealing foil strip to the top surfaces of the primary packaging shells carried by the shell carriers of the shell carrier block to form a blister strip of sealed primary packaging shells each containing one ophthalmic article of the same lot in the cavity of the respective primary packaging shell.

In accordance with one aspect, the primary packaging line according to the invention may further comprise a return belt arranged at the distal end of the discharge track and extending in a fourth transportation direction transverse to the third transportation direction to a proximal end of the supply belt, for transporting the single shell carriers of the shell carrier block to the proximal end of the supply belt to return them to the supply belt;

a number of storage magazines arranged along the return belt, each storage magazine configured to accommodate therein a plurality of blister strips of sealed primary packaging shells, the number of storage magazines arranged along the return belt being at least as high as the number of different lots of ophthalmic articles;

a blister strip placement robot, the blister strip placement robot being configured to place into each of the storage magazines only blister strips of sealed primary packaging shells containing in their cavities the same lot of ophthalmic articles, to allow for a subsequent return of the empty single shell carriers on the return belt to the proximal end of the supply belt.

In accordance with a further aspect of the primary packaging line according to the invention, the return belt may be arranged beneath a return track comprising lateral guide walls for guiding the single shell carriers of the shell carrier blocks. At least one of the lateral guide walls may be laterally movable in a direction transverse to the fourth transportation direction of movement of the return belt, for adjusting the lateral width of the return track so as to be capable of guiding shell carrier blocks of different lengths.

In accordance with another aspect, the primary packaging line according to the invention may further comprise an ejected single shell carrier return belt extending from the shell carrier ejector in a fifth transportation direction transverse to the third transportation direction back to a shell carrier insertion station arranged along the supply belt at an insertion location upstream of the primary packaging shell placement robot.

In accordance with still a further aspect, the primary packaging line according to the invention may further comprise a retainer arranged along the supply belt at the insertion location. The retainer may be configured to retain those single shell carriers arranged on the supply belt upstream of the insertion location when an ejected single shell carrier returned to the insertion location by the single shell carrier return belt is to be moved on the supply belt.

In accordance with yet another aspect of the primary packaging line according to the invention, the lot sorter may comprise the sorter compartments arranged one above the other. The lot sorter may further comprise a lifting mechanism for moving the sorter compartments up and down relative to a level at which the guiding rail is arranged along which the single shell carriers carrying the primary packaging shells containing the different lots of the ophthalmic article arrive at the lot sorter. The lot sorter may be configured to move the lifting mechanism such that that sorter compartment is arranged at the level of the guiding rail which is to contain the single shell carriers carrying the primary packaging shells of the particular lot of ophthalmic article actually arriving at the lot sorter.

In accordance with a further aspect of the primary packaging line according to the invention, each of the single shell carriers comprises a shell carrier identifier that is unique for the respective single shell carrier, for tracking each individual single shell carrier.

According to still a further aspect of the primary packaging line according to the invention, the shell placement robot may further comprise a reader for reading out the unique shell carrier identifier present on the single shell carrier.

Further in accordance with another aspect of the primary packaging line according to the invention, the blister strip placement robot further comprises a reader for reading out the unique shell carrier identifier present on the single shell carrier.

In accordance with yet another aspect, the primary packaging line according to the invention may further comprise a main dosing station arranged along the guiding rail downstream of the ophthalmic article placement robot. The main dosing station may be configured to dose a predetermined main amount of storage solution into the cavity of the primary packaging shell when the shell carrier is arranged at a main dosing location on the guiding rail.

In accordance with a further aspect, the primary packaging line according to the invention may further comprise a pre-dosing station arranged along the guiding rail upstream of the ophthalmic article placement robot. The pre-dosing station may be configured to dose a predetermined initial amount of storage solution into the cavity of the primary packaging shell when the shell carrier is arranged at a pre-dosing location on the guiding rail. The initial amount of storage solution may be less than forty percent of the total amount of storage solution to be dosed into the cavity of the primary packaging shell.

In accordance with still another aspect, the primary packaging line according to the invention may further comprise a removal station arranged along the guiding rail downstream of the ophthalmic article presence check unit and upstream of the shell carrier ejector. The removal station may be configured to remove at least ophthalmic articles and/or storage solution from the cavity of the primary packaging shell arranged along the single shell carrier in case a primary packaging shell has been determined by the ophthalmic article presence check unit to contain in its cavity a number of ophthalmic articles different from one.

Yet in accordance with another aspect of the primary packaging line according to the invention, the removal station may be further configured to also remove the primary packaging shell from the single shell carrier in case the shell placement robot has read a said unique shell carrier identifier a predetermined number of times after the single shell carrier with the respective primary packaging shell arranged thereon has been ejected and returned to the supply belt.

In accordance with another aspect, the primary packaging line according to the invention may further comprise a printing station, in particular a laser printing station. The printing station may be arranged along the discharge track downstream of the sealing station, for printing data associated with the ophthalmic article contained in the cavity of the primary packaging shell to the sealing foil sealed to the primary packaging shell at the sealing station.

In accordance with still a further aspect of the primary packaging line according to the invention, the supply belt may be arranged beneath a supply track comprising lateral guide walls for guiding the single shell carriers along the supply track. The supply track may comprise a buffer section upstream of the shell carrier insertion station.

As a general difference, the primary packaging line according to the invention comprises a plurality of single shell carriers each configured to carry only one primary packaging shell, as opposed to shell carriers commonly carrying a plurality of primary packaging shells on the same shell carrier (for example five or six primary packaging shells on the same shell carrier). This allows to individually process each primary packaging shell arranged on a said single shell carrier rather than being required to commonly process a plurality of such primary packages arranged on the same carrier.

Initially, the single shell carriers are placed on a supply belt that transports the single shell carriers towards a downstream end of the supply belt. A primary packaging shell placement robot is arranged along the supply belt and typically places one empty primary packaging shell on a said single shell carrier, as the single shell carrier passes the primary packaging shell placement robot. There is only one exception: In case a single shell carrier with an empty primary packaging shell arranged thereon is returned by the ejector (as is explained further below) and returned to the supply belt, this returned single shell carrier already has a primary packaging shell arranged thereon. In this case, the primary packaging shell placement robot does not place a primary packaging shell on the returned single shell carrier. In any event, at the downstream end of the supply belt a primary packaging shell is arranged on each single shell carrier (either by being placed thereon by the primary packaging shell robot or by already being arranged on an ejected and returned shell carrier).

At the downstream end of the supply belt, there is arranged a cyclically and intermittently movable singling conveyor belt that extends in a direction transverse to the supply belt. This singling conveyor belt is configured to receive a said single shell carrier that is arranged at the downstream end of the supply belt. In case a queue of single shell carriers has formed near the downstream end of the supply belt, during an actual cycle that single shell carrier which is arranged at the most downstream position in the queue is received by the singling conveyor belt. For example, the singling conveyor belt may comprise individual compartments bounded by webs at the front end and at the back end of each compartment such that each compartment is configured to receive one single shell carrier which is laterally moved into the said compartment by the supply belt. The singling conveyor belt then cyclically and intermittently transports the shell carrier received during an actual cycle and those shell carriers received during preceding cycles in a second transportation direction (that of the singling conveyor belt) transverse to the first transportation direction (that of the supply belt) towards a downstream end of the singling conveyor belt.

At the downstream end of the singling conveyor belt, there is arranged a guiding rail that extends in a direction transverse to the singling conveyor belt. The guiding rail is configured to receive during a respective cycle of the singling conveyor belt that single shell carrier that is arranged at the downstream end of the single conveyor belt (e.g. in the respective compartment that is actually arranged at the downstream end of the singling conveyor belt). The guiding rail is further configured to guide the received single shell carrier in a third transportation direction transverse to the second transportation direction (that of the singling conveyor belt). A pusher is also arranged at the downstream end of the singling conveyor belt, and this pusher is configured to push the single shell carrier arranged at the downstream end of the singling conveyor belt on the guiding rail (for example, the pusher pushes the single shell carrier laterally out of the compartment at the downstream end of the singling conveyor belt on the guiding rail). As the guiding rail does not have any active transportation mechanism for transporting the single shell carriers arranged thereon along the guiding rail, by pushing the respective single shell carrier from the singling conveyor belt on the guiding rail, those single shell carrier that have been pushed on the guiding rail during preceding cycles are pushed along the guiding rail.

An ophthalmic article placement robot is arranged along the guiding rail and is configured to place an ophthalmic article into the cavity of the primary packaging shell arranged on the respective single shell carrier. This ophthalmic article placement robot may comprise the transfer gripper that has picked the ophthalmic article up from the inspection cuvette and that releases the ophthalmic article into the cavity of the primary packaging line.

In case the ophthalmic article placement robot always correctly places one ophthalmic article into each cavity of each primary packaging shell, no corrective measures are necessary. However, as has been described above there may be occurrences where either no ophthalmic article may be placed into the cavity of a primary packaging shell, or more than one ophthalmic article (e.g. two) may be placed into the cavity of the respective primary packaging shell. To identify whether one ophthalmic article (or a number different from one) is contained in the cavity of the respective primary packaging shell, the ophthalmic article presence check unit arranged along the guiding rail downstream of the ophthalmic article placement robot determines whether one ophthalmic article (or a number different from one) is contained in the cavity of each primary packaging shell.

And in case the determination made by the ophthalmic article presence check unit is that a number of ophthalmic articles different from one is contained in a cavity of a particular primary packaging shell arranged on a said single shell carrier, a shell carrier ejector arranged along the guiding rail downstream of the ophthalmic article presence check unit ejects the said single shell carrier from the guiding rail, whereas those single shell carriers having primary packaging shells arranged thereon each containing one ophthalmic article are moved along the guiding rail towards a lot sorter that is arranged along the guiding rail downstream of the shell ejector. Accordingly, only single shell carriers having primary packaging shells arranged thereon which contain one ophthalmic article arrive at the lot sorter.

The lot sorter arranged along the guiding rail downstream of the shell ejector and the sealing device arranged downstream of the lot sorter along a discharge track as well as other components of the primary packaging line according to the invention are discussed further below. However, from the foregoing discussion of the components of the primary packaging line it is already clear that only such primary packaging shells containing one ophthalmic article may reach the lot sorter and the sealing device. Thus, sealing of primary packaging shells containing a number of ophthalmic articles different from one is excluded.

This is advantageous in that it avoids that a whole blister strip of sealed primary packages must be discarded further downstream in the primary packaging line solely because one of the sealed primary packages of the blister strip contains a number of articles different from one (e.g. zero or two ophthalmic articles). The production yield is thus increased.

In addition, it allows to keep the transfer gripper simple from a constructional point of view: The transfer gripper may simply pick and place into the cavity of the primary packaging whatever adheres to the transfer gripper, regardless of whether this being one, more than one, or no ophthalmic article. This is possible, since with the aid of the ophthalmic article presence check unit further downstream in the primary packaging line it is determined in any event whether or not there is exactly one ophthalmic article contained in the cavity of the primary packaging shell arranged on the respective single shell carrier. In case the number of ophthalmic articles is different from one, that single shell carrier with that primary packaging shell is ejected, but only that single shell carrier and only that single primary packaging shell arranged thereon are ejected. In contrast thereto, in prior art primary packaging lines the transfer grippers are more sophisticated from a constructional point of view and comprise, for example, a test vacuum channel for determining whether or not an ophthalmic article (e.g. a soft contact lens) actually adheres to the transfer gripper after the pick-up and has been released from the gripper after the transfer, to avoid too many occurrences in which a whole blister strip must be discarded due to one of the sealed primary packaging shells containing in its cavity a number of ophthalmic articles different from one.

Moreover, in the primary packaging line according to the invention the primary packaging shells containing either zero, two, or any other number of ophthalmic articles different from one may be re-used, although this is not mandatory. That is, the content of such primary packaging shells may be removed from the cavity of the primary packaging shell in a removal station arranged upstream of the shell carrier ejector, and then the ejected single shell carrier together with the empty primary packaging shell arranged thereon may be returned by an ejected single shell carrier return belt to the supply belt, so that the ejected single shell carrier together with the empty primary packaging shell arranged thereon can subsequently be re-used, thus reducing waste. This is not possible in prior art primary packaging lines.

Yet further, in the primary packaging line according to the invention, a particular emptied primary packaging shell arranged on the same single shell carrier may be returned several times (depending on the respective determination made by the ophthalmic article presence check unit). The returned single shell carrier (either with or without the empty primary packaging shell arranged thereon) may then be inserted at an insertion location arranged along the supply belt ahead of the shell placement robot, so that the returned single shell carrier (with or without the empty primary packaging shell arranged thereon) is placed on the supply belt again.

To successfully perform insertion of the single shell carrier returned to the insertion location by the single shell carrier return belt, collisions with any single shell carriers arranged on the supply belt and conveyed towards the distal end of the supply belt must be avoided. For that reason, the primary packaging line may further comprise a retainer arranged along the supply belt at the insertion location. For example, the retainer may comprise a retainer bar to retain those single shell carriers arranged on the supply belt upstream of the insertion location, so that the returned single shell carrier can then be moved on the supply belt. The supply belt may be arranged beneath a supply track comprising lateral guide walls for guiding the single shell carriers along the supply track and may comprise a buffer section upstream of the shell carrier insertion station, so that it is possible to insert a returned single shell carrier at the insertion station into the stream of single shell carriers transported along the supply track by the supply belt.

However, with an increasing number of returns of the same primary packaging shell the bioburden of that particular primary packaging shell may increase, too. The single shell carrier of the primary packaging line of the instant invention may comprise a shell carrier identifier that is unique for the respective single shell carrier, so that tracking of each individual single shell carrier in the primary packaging line is possible. Accordingly, after the same single shell carrier is ejected and returned to the supply belt a predetermined number of times with the same primary packaging shell arranged thereon, that primary packaging shell is removed from the shell carrier to avoid too high a bioburden of the primary packaging shell. In such instance, the primary packaging shell placement robot places a new primary packaging shell on the said single shell carrier as the single shell carrier passes the primary packaging shell robot.

To achieve this, each time a single shell carrier transported by the support belt arrives at the shell placement robot the shell placement robot may read the unique shell carrier identifier. In case the single shell carrier identified by its unique shell carrier identifier is a single shell carrier that has been ejected by the ejector and returned to an insertion station arranged along the supply belt upstream of the shell placement robot, the shell placement robot does not place a new (unused) primary packaging shell on that single shell carrier, but instead may increase a shell return counter (for this particular primary packaging shell) by one, for example. This is repeated as long as the shell return counter has not counted the afore-mentioned predetermined number of returns of the same primary packaging shell arranged on the same single shell carrier. Once the shell return counter has counted the afore-mentioned predetermined number (of returns), the primary packaging shell is removed from the single shell carrier and is discarded. A new (unused) primary packaging shell is then placed on that single shell carrier, and the shell return counter is reset to zero for that new (unused) primary packaging shell.

In case the ophthalmic article presence check unit has determined that there is one ophthalmic article contained in the cavity of the primary packaging shell arranged on the respective single shell carrier, that single shell carrier is allowed to pass the shell carrier ejector without being ejected from the guiding rail (this being the normal scenario). The single shell carrier with the primary packaging shell containing in its cavity one ophthalmic article then arrives at the lot sorter which is arranged downstream of the shell ejector laterally relative to the guiding rail along which the single shell carriers are transported.

In case a storage solution is to be dispensed (dosed) into the cavity of the primary packaging shells, which is typically the case for soft contact lenses as ophthalmic articles, this dispensing (dosing) operation may be performed, for example, in one step or in two steps. If it is performed in one step, then it may be performed at a main dosing station arranged along the guiding rail downstream of the ophthalmic article placement robot (and upstream of the shell carrier ejector). In such case, the total amount of storage solution is dispensed (dosed) into the cavity of the primary packaging shell at the main dosing station, i.e. after the ophthalmic article—e.g. the soft contact lens—has been placed into the cavity of the primary packaging shell. If the dispensing (dosing) operation is performed in two steps, an initial amount of storage solution which is less than forty percent of the total amount of storage solution is dispensed (dosed) into the cavity of the primary packaging shell at a pre-dosing station arranged along the guiding rail upstream of the ophthalmic lens placement robot. The attractive forces of the pre-dosed storage solution in the cavity of the primary packaging shell then simplifies the transfer of the ophthalmic article, e.g. the soft contact lens, from the ophthalmic article placement robot, e.g. from a transfer gripper of such robot, into the cavity of the primary packaging shell.

In case a single shell carrier is to be ejected due to the determination made by the ophthalmic article presence check unit, a removal station may be arranged along the guiding rail downstream of the ophthalmic article presence check unit and upstream of the shell carrier ejector. In case the afore-mentioned main dosing station is present, the removal station may be arranged downstream of the main dosing station. The removal station is configured to remove at least the ophthalmic articles and/or the storage solution (depending on what is actually contained in the cavity) from the cavity of the primary packaging shell before the shell carrier reaches the shell carrier ejector and is ejected. In case the whole primary packaging shell is to be removed, too, this may also be performed at the removal station (for example, due to too high a possible bioburden), so that in this case the empty single shell carrier is ejected and returned.

As mentioned, those single shell carriers that have been determined by the ophthalmic article presence check unit to contain only one ophthalmic article in the cavity of the primary packaging shell arranged on the single shell carrier may pass the ejector and arrive at the lot sorter.

The lot sorter comprises a plurality of sorter compartments corresponding in number to the number of different lots of ophthalmic articles to be placed by the ophthalmic article placement robot into the cavities of the primary packaging shells. The lot sorter is further configured to receive and store in each sorter compartment only single shell carriers all carrying a said primary packaging shell containing in its cavity one ophthalmic article of the same lot.

For example, the lot sorter may comprise the sorter compartments arranged one above the other. The lot sorter may further comprise a lifting mechanism for moving the sorter compartments up and down relative to a level at which the guiding rail is arranged along which the single shell carriers carrying the primary packaging shells containing the different lots of the ophthalmic article arrive at the lot sorter. Depending on which lot of ophthalmic article is contained in the cavity of the primary packaging shell actually arriving at the lot sorter, the lifting mechanism may be moved such that that sorter compartment is arranged at the level of the guiding rail which is to contain the particular lot of ophthalmic article that actually arrives at the lot sorter. The arrangement of the sorter compartments one above the other is particularly advantageous in case of soft contact lenses as ophthalmic articles, as the cavity of the primary packaging shell typically contains an amount of storage solution, e.g. saline, in addition to the soft contact lens. An up-and-down movement of the (unsealed) primary packaging shells stored in the sorter compartments and containing the storage solution thus prevents spillage of the solution out of the cavities during movement. Although the arrangement of the sorter compartments one above the other is advantageous, it is conceivable that the sorter compartments are arranged laterally adjacent to one another, and are movable in a horizontal plane. However, a movement of the sorter compartments in the horizontal plane may possibly result in spillage of the storage solution, and this is why an arrangement of the sorter compartments one above the other may be preferred.

When a predetermined number of single shell carriers is contained in the respective sorter compartment of the lot sorter, these single shell carriers stored in the said sorter compartment are pushed out of the respective sorter compartment back on the guiding rail once a single shell carrier with a primary packaging shell containing in its cavity an ophthalmic article of the same lot is expected to arrive at the lot sorter. A shell carrier block transportation mechanism arranged at the lot sorter beneath the guiding rail then transports the shell carrier block, which is formed by the predetermined number of single shell carriers pushed out of the sorter compartment on the guiding rail and the next shell carrier arriving at the lot sorter, along a discharge track extending downstream of the lot sorter in the same direction as the single shell carriers are moved along the guiding rail (third transportation direction).

At a sealing device that is arranged along the discharge track a sealing foil strip, comprising a number of individual sealing foils which are connected to one another to form the sealing foil strip, is placed on the primary packaging shells arranged on the single shell carriers of the shell carrier block. The number of individual sealing foils of the sealing foil strip corresponds to the number of single shell carriers of the shell carrier block (and thus also corresponds to the number of primary packaging shells arranged thereon, each containing one ophthalmic article). The individual foils are then sealed to the top surfaces of the individual primary packaging shells to form a blister strip of sealed primary packages each containing one ophthalmic article of the same lot in the cavity of the respective primary packaging shell.

Further downstream along the discharge track a printing station may be arranged, for example a laser printing station. This laser printing station may be configured to print data associated with the respective ophthalmic article contained in the cavity of the respective primary packaging shell to the sealing foil sealed to that primary packaging shell. For example, in case the ophthalmic article is a soft contact lens, the lens diameter, base curve radius, the diopters of the vision correction, the lot number, etc. may be printed to the sealing foil (without this list of data being exhaustive). Further downstream, the shell carrier block having the blister strip of sealed primary packages with the printed foils arranged thereon may reach the distal end of the discharge track.

At the distal end of the discharge track, a return belt may be arranged. This return belt may extend in a transportation direction transverse to the transportation direction of the discharge track, and back to a proximal end of the supply belt. The purpose of this return belt is to return the single shell carriers to the supply belt, however, without the blister strip of sealed primary packages arranged thereon. Along the return belt, there are arranged a number of storage magazines, and each storage magazine is configured to accommodate therein a plurality of the blister strips of sealed primary packages. The number of storage magazines is at least as high as the number of different lots of ophthalmic articles. A blister strip placement robot which may be arranged at the downstream end of the discharge track may be configured to place into each of the storage magazines only sealed blister strips of the same lot of ophthalmic articles. That is, the blister strip placement robot is configured to remove the blister strip of sealed primary packaging shells from the shell carrier block and place the blister strip into that storage magazine in which blister strips containing that lot of ophthalmic articles—and only that lot—are stored. For example, the blister strip placement robot may comprise a reader to read the afore-mentioned unique shell carrier identifiers of the shell carrier block on which the blister strip of sealed primary packaging shells is arranged to learn which lot of ophthalmic articles is contained in the blister strip. The blister strip placement robot then places the blister strip in the corresponding storage magazine, so that the empty single shell carriers of the shell carrier block may then be returned to the supply belt at the proximal end thereof.

As mentioned further above, generally the sealed blister strips may comprise different numbers of sealed primary packages, and thus they may have different lengths. For example, a blister strip may comprise five sealed primary packaging shells, while other blister strips may comprise three sealed primary packaging shells only (even though a shell carrier block may be formed having two separate blister strips of three sealed primary packages arranged thereon). To render the primary packaging line according to the invention capable of handling different lengths of shell carrier blocks (and blister strips arranged thereon), the return belt may be arranged beneath a track that comprises lateral guide walls for guiding the shell carrier blocks, and at least one of these lateral guide walls may be laterally movable to adjust the lateral width of the return track to the respective length of the shell carrier block carrying the blister strip(s).

BRIEF DESCRIPTION OF THE DRAWINGS

Further advantageous aspects of the primary packaging line according to the invention will become apparent from the detailed description of embodiments with the aid of the schematic drawings in which.

DESCRIPTION OF EMBODIMENTS

Figure 1:
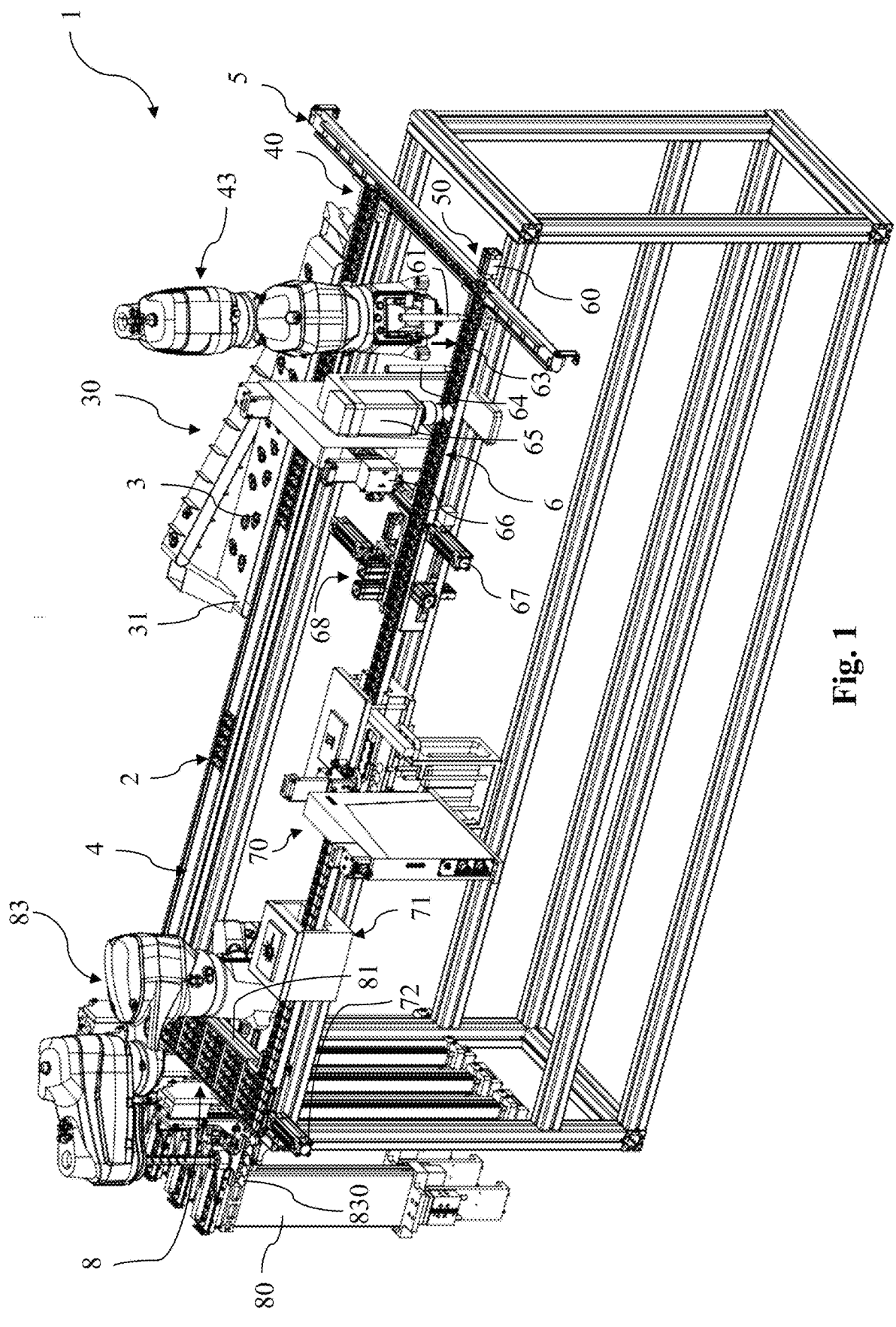
FIG. 1 shows a perspective view of some components of an embodiment of a primary packaging line according to the invention.
Figure 2:
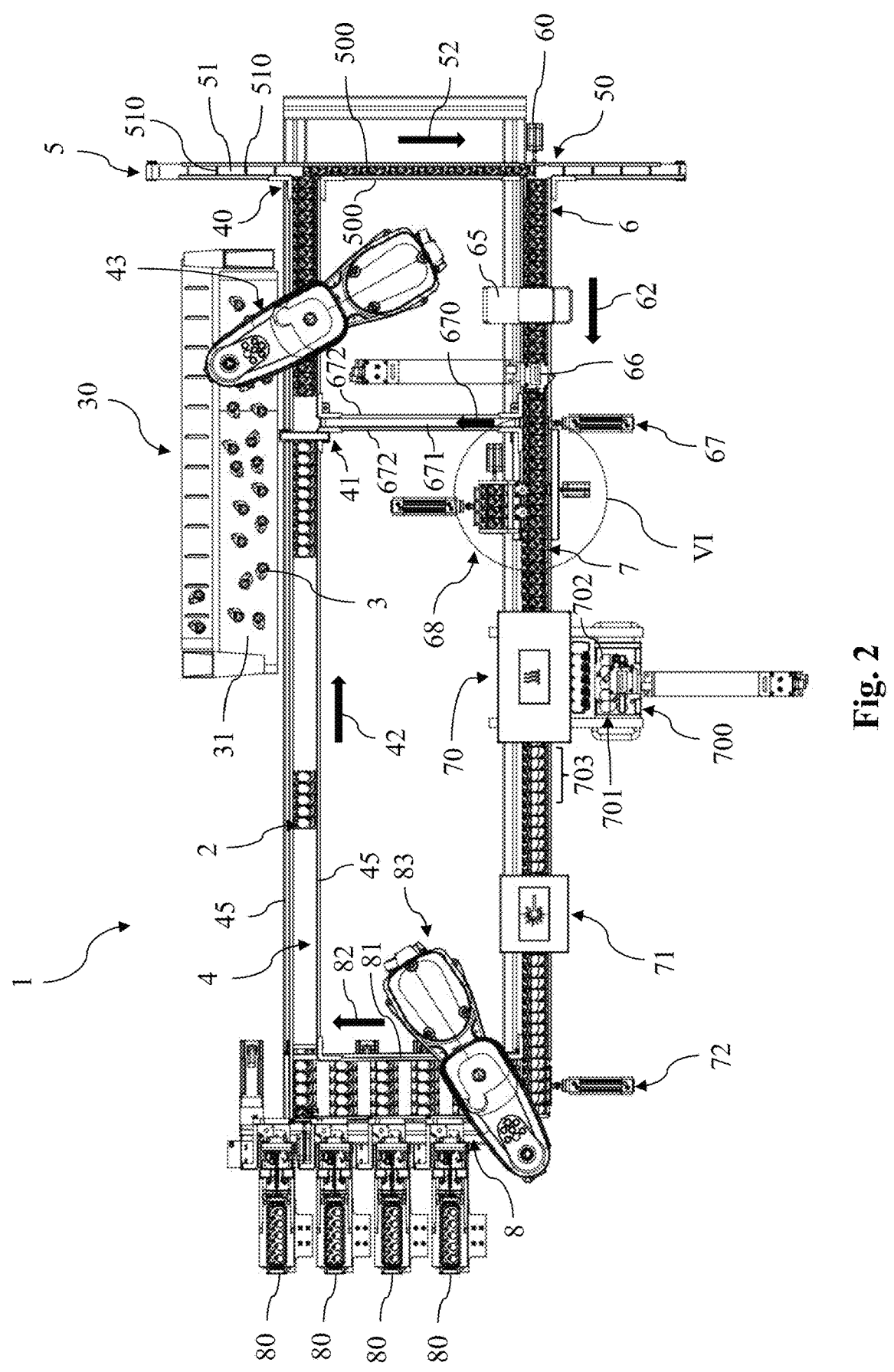
FIG. 2 shows a top view of the components of the embodiment of the primary packaging line of FIG. 1.

FIG. 1 shows a perspective view of some components of a first embodiment of a primary packaging line for packaging ophthalmic articles, for example ophthalmic lenses, in particular contact lenses such as soft contact lenses, according to the invention, and FIG. 2 shows these components in a top view. In the following, by way of example it is referred to soft contact lenses representing the ophthalmic articles. For the sake of simplicity, by way of example the following description refers to soft contact lenses representing the ophthalmic article. Primary packaging line 1 comprises a plurality of single shell carriers 2 (one such single shell carrier being shown in FIG. 3) each of which is configured to carry a single primary packaging shell 3 thereon (see FIG.

4). Primary packaging shell 3 comprises a cavity 33 for accommodating the soft contact lens (and possibly any storage solution).

Figure 4:
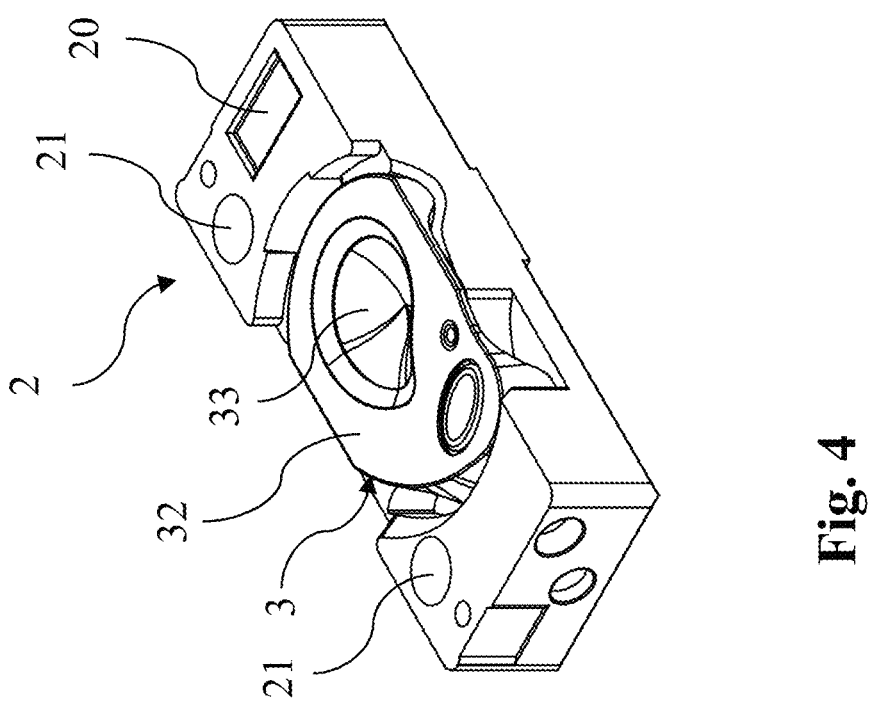
FIG. 4 shows a perspective view of the embodiment of the single shell carrier of FIG. 3, with a primary packaging shell arranged thereon.
Figure 3:
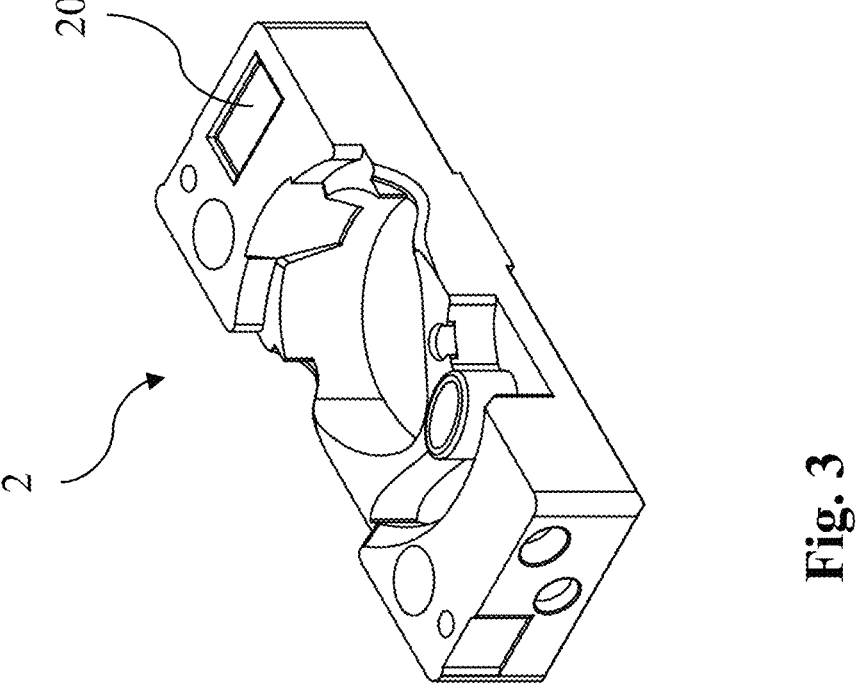
FIG. 3 shows a perspective view of an embodiment of a single shell carrier of the primary packaging line according to the invention.

As can be seen in FIG. 3 and FIG. 4, single shell carrier 2 comprises a shell carrier identifier 20 that is unique for each individual single shell carrier 2. Shell carrier identifier 20 may be embodied as an RFID, an optical identifier, a magnetic identifier, or any other suitable identifier that can be automatically read. With the aid of the unique shell carrier identifier 20 a central control unit of the primary packaging line 1 always knows where a particular single shell carrier 2 is located in the primary packaging line, whether or not a particular single shell carrier 2 already has a primary packaging shell 3 arranged thereon, which lot of soft contact lens is contained in the cavity 33 of the primary packaging shell 3 arranged on the respective single shell carrier 2, whether or not the cavity 33 of a primary packaging shell 3 arranged on the respective single shell carrier 2 contains a number of soft contact lenses different from one, etc.

Turning back to FIG. 1 and FIG. 2, primary packaging line 1 comprises a supply belt 4 which is configured to transport the individual single shell carriers 2 arranged thereon in a first transportation direction 42 to a downstream end 40 of the supply belt 4. A primary packaging shell placement robot 43 is arranged along the supply belt 4. Primary packaging shell placement robot 43 is configured to place a said primary packaging shell 3 on the single shell carrier 2, one primary packaging shell 3 on one single shell carrier 2 (see FIG. 4). The primary packaging shells 3 may be provided by a shell supply unit 30 comprising a shell supply belt 31 from which shell placement robot 43 may pick a primary packaging shell 3 and place it on the single shell carrier 2, so that at the downstream end 40 of supply belt 4 there is always a primary packaging shell 3 arranged on each single shell carrier 2. There is one exception from this shell placement action of shell placement robot 43: In case a single shell carrier 2 having an empty primary packaging shell 3 arranged thereon is already arranged on a single shell carrier 2, for example when a single shell carrier 2 having an empty primary packaging shell 3 arranged thereon is returned to the supply belt 4 at an insertion station 41 (described in more detail below), primary packaging shell placement robot 43 detects (by reading the unique shell carrier identifier 20) that there is already a primary packaging shell 3 arranged on that single shell carrier 2, and in such case shell placement robot 43 does not place a primary packaging shell 3 on the said single shell carrier 2.

Supply belt 4 is arranged beneath a supply track that comprises lateral guide walls 45 for guiding the single shell carriers 2 along the supply track. The supply track comprises a buffer section upstream of the shell carrier insertion station 41, since at certain times the single shell carriers 2 arranged on the supply belt 4 may be retained to allow for insertion of an ejected and returned single shell carrier 2, as will be described in more detail below.

At the downstream end 40 of supply belt 4 a singling conveyor belt 5 is arranged which is cyclically and inter-mittently movable. Singling conveyor belt 5 extends in a direction transverse to supply belt 4 (here: perpendicular to supply belt 4 and in the same plane). Singling conveyor belt 5 comprises a plurality of compartments 51 each of which is bounded by upstanding webs 510 at the front end and at the back end of each compartment 51 (the web 510 at the back end of a preceding compartment 51 forms the web 510 at the front end of the next compartment 51. That compartment 51 of singling conveyor belt 5 which—during an actual cycle— is arranged at the downstream end 40 of supply belt 4 is configured to receive the single shell carrier 2 (with the primary packaging shell 3 arranged thereon) from supply belt 4. During each actual cycle, singling conveyor belt 5 is then intermittently moved by the distance of one compart-ment 51 in a second transportation direction 52 transverse to the first transportation direction 42 of supply belt 4 towards a downstream end 50 of singling conveyor belt 5. Accord-ingly, after having received the single shell carrier 2 in that compartment 51 arranged at the downstream end 40 of supply belt 4, the singling conveyor belt 5 is intermittently moved to the next position and thus moves the newly received single shell carrier 2 as well as those single shell carriers 2 received during preceding cycles towards the downstream end 50. Lateral guide walls 500 are arranged at both lateral sides of singling conveyor belt 5 to make sure the single shell carriers 2 are properly guided.

At the downstream end 50 of singling conveyor belt 5 a guiding rail 6 is arranged. Guiding rail 6 extends in a direction transverse to singling conveyor belt 5 (again: perpendicular and in the same plane) and is configured to receive during the respective actual cycle of the singling conveyor belt 5 that single shell carrier 2 (with the primary packaging shell 3 arranged thereon) which is arranged at the downstream end 50 of singling conveyor belt 5.

Guiding rail 6 is further configured to guide a said received single shell carrier 2 in a third transportation direction 62 transverse to the second transportation direction 52 of the singling conveyor belt 5. Guiding rail 6 itself does not comprise an active conveying mechanism for moving the single shell carriers 2 along the guiding rail in the third transportation direction 62.

To perform the transfer of the respective single shell carrier 2 from singling conveyor belt 5 to guiding rail 6, a pusher 60 is arranged at the downstream end 50 of singling conveyor belt 5. When the particular compartment 51 having the single shell carrier 2 arranged therein arrives at the downstream end 50 during the intermittent movement of the singling conveyor belt 5, the pusher 60 performs a pushing movement (in FIG. 2 in the third transportation direction 62) to push the single shell carrier 2 out of the compartment 51 of the singling conveyor belt 5 and on the guiding rail 6. By this pushing the single shell carrier 2 out, those single shell carriers 2 that have been pushed on the guiding rail 6 during preceding pushing actions of the pusher 60 are transported along the guiding rail 6 in the third transportation direction 62.

In the embodiment shown in FIG. 1, the next station arranged along the guiding rail 6 is a pre-dosing station 61 (illustrated by a pre-dosing tip in FIG. 1) configured to dose an initial amount of storage solution, e.g. saline, into the cavity 33 of the primary packaging shell 3 arranged on the respective single shell carrier 2. This initial amount of storage solution is less than 40% of the total amount of storage solution to be dosed into the cavity 33 of the respective primary packaging shell 3. The initial amount of storage solution simplifies the transfer of the soft contact lens from the ophthalmic article placement robot 63 (indi-cated by the arrow in FIG. 1 and typically comprising a gripper to which the soft lens adheres) to the cavity 33 of the primary packaging shell 3. Ophthalmic article placement robot 63 is arranged downstream of pre-dosing station 61 along the guiding rail 6.

After the soft contact lens has been placed by ophthalmic article placement robot 63 into the cavity 33 of primary packaging shell 3 having the initial amount of storage solution contained therein, in the further course of transportation along the guiding rail 6 the single shell carrier 2 arrives at a main dosing station 64 (again illustrated by a main dosing tip in FIG. 1) which is arranged along the guiding rail 6 downstream of the ophthalmic article placement robot 63, an which is configured to dose a main amount of storage solution (the total amount minus the pre-dosed initial amount) into the cavity 33 of the primary packaging shell 3 that already contains the soft contact lens as well as the initial amount of storage solution.

An ophthalmic article presence check unit 65 is arranged along the guiding rail 6 downstream of the main dosing station 64. Ophthalmic article presence check unit may, for example, comprise a camera and possibly also an image analysis device. Upon analysis of an image of the content of the cavity 33 of primary packaging shell 3 arranged on the single shell carrier 2, the ophthalmic article presence check unit 65 determines whether cavity 33 contains exactly one soft contact lens or contains a number different from one (for example, no soft contact lens or two soft contact lenses).

Figure 5:
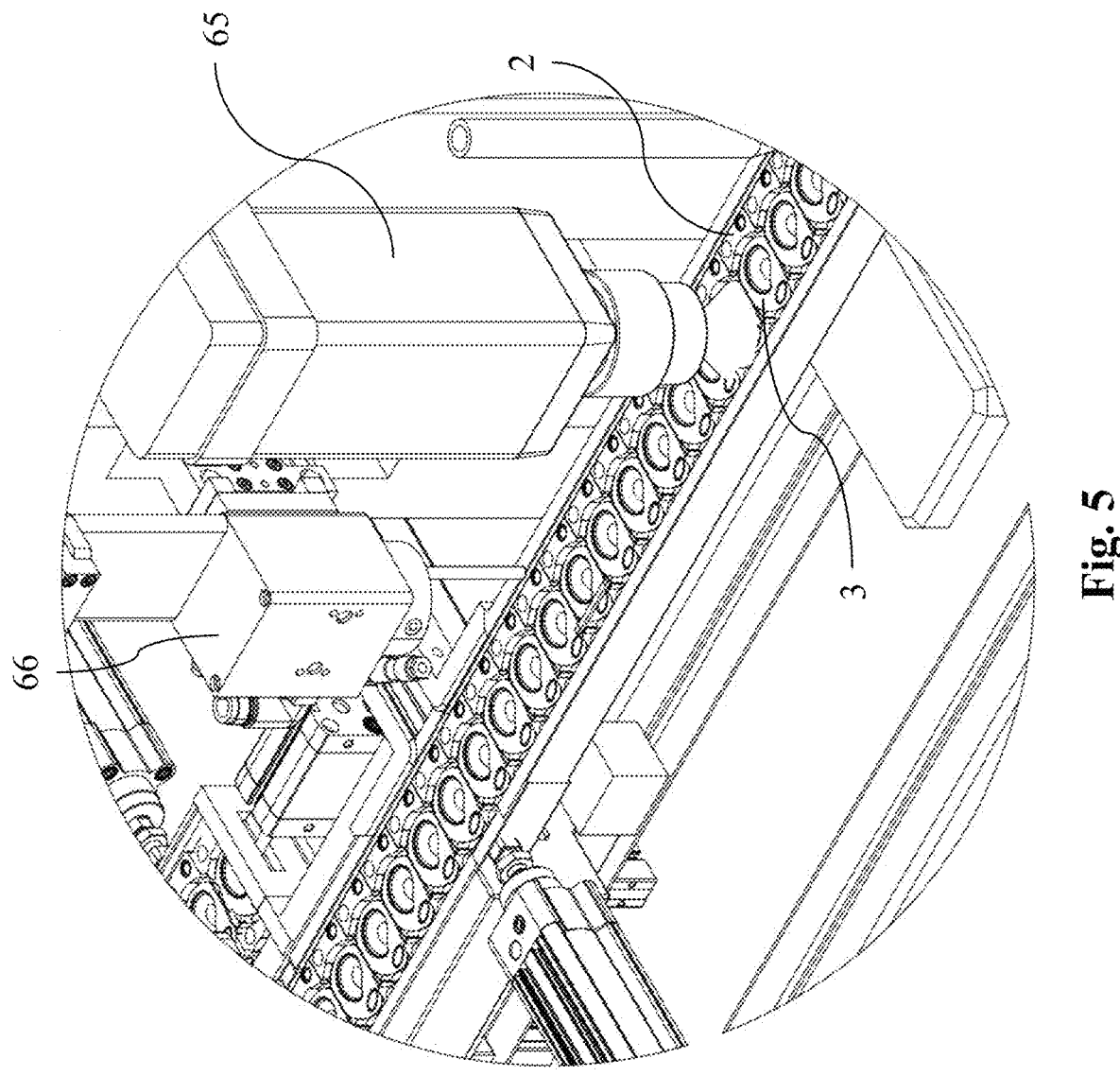
FIG. 5 shows a perspective view of a detail of the embodiment of the primary packaging line of FIG. 1, showing the lens presence check unit and the ejector.

Downstream of the ophthalmic article presence check unit 65 a removal station 66 is arranged along the guiding rail 6. The purpose of this removal station 66 is to remove the content contained in the cavity 33 of primary packaging shell 3 in case it has been determined by the ophthalmic article presence check unit 65 that a number of soft contact lenses different from one is contained in the cavity 33. By way of example, the removal station 66 may comprise a suction head for sucking the content out of the cavity 33 of the primary packaging shell 3 arranged on the single shell carrier 2. Ophthalmic article presence check unit 65 and removal station 66 are shown in an enlarged view in FIG. 5.

Further downstream of the removal station 66 a shell carrier ejector 67 is arranged along the guiding rail 6. In case the ophthalmic article presence check unit 65 has determined that the cavity 33 of the primary packaging shell 3 arranged on a particular single shell carrier 2 contains a number of soft contact lenses different from one, the removal station 66 removes the content (i.e. the soft contact lens and the storage solution) from the cavity 33 of the primary packaging shell 3 arranged on the said particular single shell carrier 2, and at the time this particular single shell carrier 2 with the empty primary packaging shell 3 arranged thereon arrives at the shell carrier ejector 67, it is ejected from the guiding rail 6 (i.e. it is ejected from the queue of single shell carriers 2 that is moved along the guiding rail 6 in the third transportation direction 62), as this is indicated by arrow 670 in FIG. 2.

Figure 7:
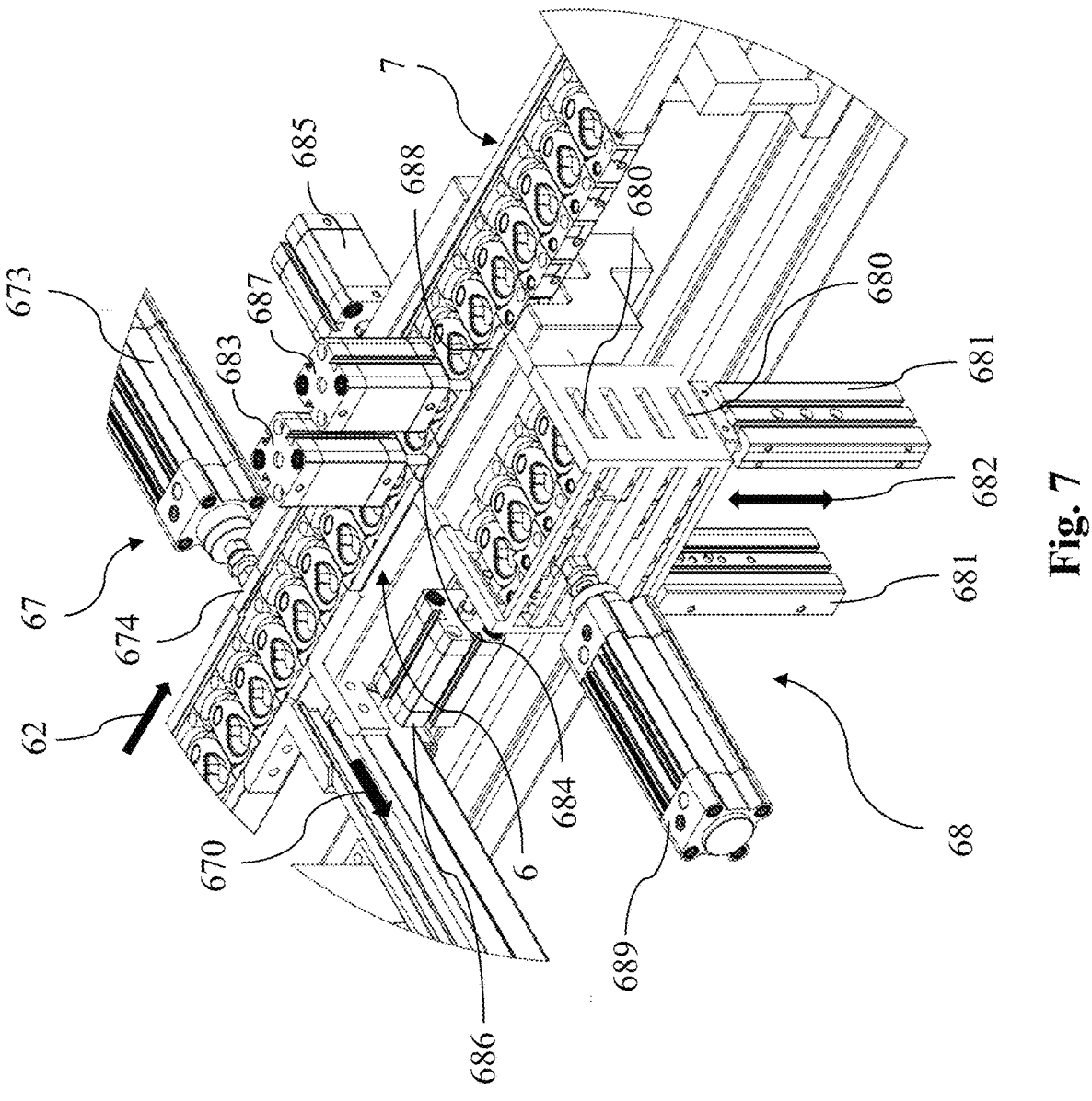
FIG. 7 shows a perspective view of the lot sorter of FIG. 6, as well as the ejector.

The ejector 67 is also shown in an enlarged view in FIG. 7, and may comprise a linear actuator 673 and a pushing plate 674. For ejecting a single shell carrier 2 with the primary packaging shell 3 arranged thereon, the linear actuator 673 moves pushing plate 674 in the direction of arrow 670. Thereafter, linear actuator 673 and pushing plate 674 are returned to the initial position shown in FIG. 7. The ejected single shell carrier 2 with the empty primary packaging shell 3 arranged thereon may be returned to the supply belt 4 and may be re-used. This is discussed in more detail further below.

In case the ophthalmic article presence check unit 65 has determined that the cavity 33 of the primary packaging shell 3 arranged on a particular single shell carrier 2 contains exactly one soft contact lens, the single shell carrier 2 with the primary packaging shell 3 arranged thereon containing in its cavity 33 the soft contact lens and the storage solution is allowed to pass the shell carrier ejector 67 without getting ejected from the guiding rail 6 (or from the queue of single shell carriers 2 arranged thereon, respectively). Such single shell carrier 2 will then arrive at the lot sorter 68.

Figure 6:
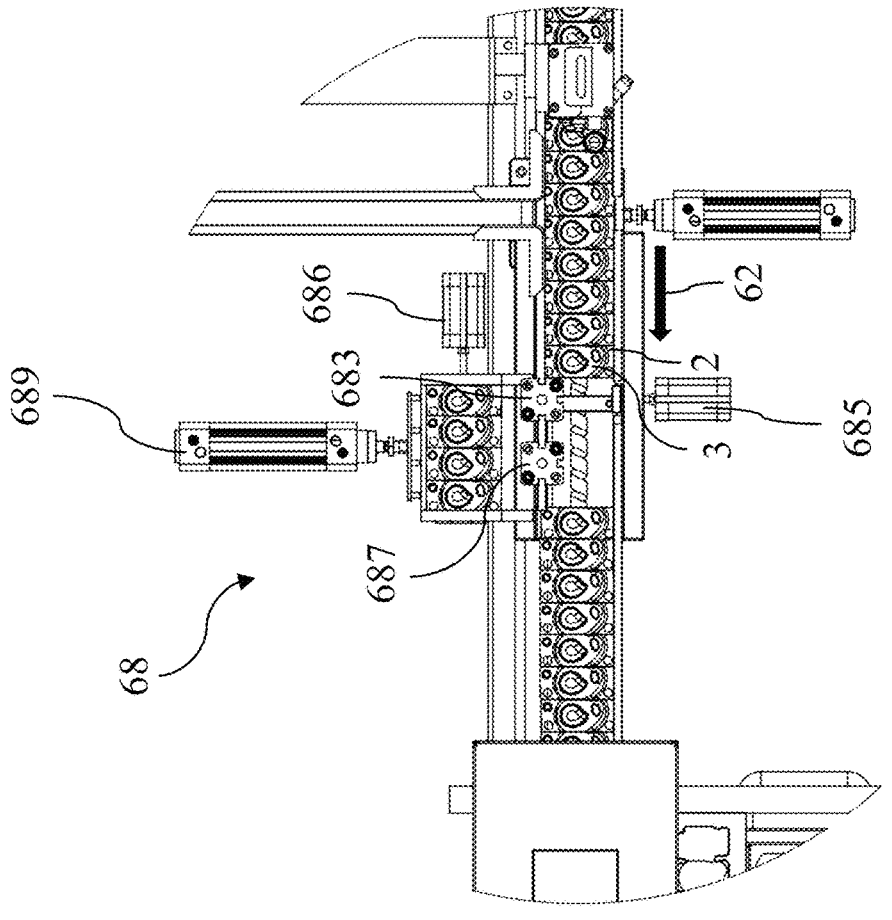
FIG. 6 shows a top view of the lot sorter of the embodiment of the primary packaging line of FIG. 1, downstream of the ejector.

FIG. 6 shows detail VI of FIG. 2 in an enlarged view including the lateral arrangement of the lot sorter 68 relative to the guiding rail 6, and FIG. 7 shows a perspective view in which lot sorter 68 can be seen as well. Lot sorter 68 comprises a plurality of sorter compartments 680 which are arranged one above the other. In the embodiment shown, lot sorter 68 comprises four such sorter compartments 680 of which in FIG. 7 only the uppermost sorter compartment and the lowermost sorter compartment are labelled. In addition, lot sorter 68 comprises a lifting mechanism 681 for moving the sorter compartments 680 up and down (indicated by the double-headed arrow 682) relative to a level at which the guiding rail 6 is arranged and along which the single shell carriers 2 carrying the primary packaging shells 3 containing the different lots of soft contact lenses and the storage solution arrive at the lot sorter 68 as they are moved in the third transportation direction 62 along guiding rail 6. This vertical movement of the sorter compartments 680 is advantageous, as the vertical movement of the single shell carriers 2 carrying the primary packaging shells 3 each containing a soft contact lens and the storage solution prevents spillage of storage solution out of the cavities 33 of the primary packaging shells 3. However, it is possible as well that the lot sorter compartments 680 be arranged horizontally in the same plane adjacent to one another (rather than one above the other, as shown), with each sorter compartment being arranged to extend in a direction perpendicular to the third transportation direction 62 in the same plane in which the single shell carriers 2 are transported along guiding rail 6. In such case, a lateral shifting mechanism (not shown) is provided instead of the lifting mechanism, and this lateral shifting mechanism is then capable of moving the compartments (which are arranged in the same plane) in a direction parallel to the third transportation direction 62.

By way of example, the embodiment of the primary packaging line 1 is shown as being capable of handling four different lots of soft contact lenses, but this number of different lots is by way of example only and for the sake of simplicity of the drawings. Accordingly, the lot sorter 68 comprises four sorter compartments 680 so that each sorter compartment 680 may only receive and contain single shell carriers 2 carrying primary packaging shells 3 all containing the same lot (of the four lots) of soft contact lenses in their cavities 33 (one soft contact lens in each cavity 33).

Generally, the four positions on the guiding rail 6 corresponding to the four positions in the sorter compartments 680 of the lot sorter 68 are empty (see FIG. 6). In case the next single shell carrier 2 to arrive at the lot sorter 68 carries a primary packaging shell 3 in the cavity 33 of which is contained a contact lens of a lot for which the corresponding sorter compartment 680 contains less than four single shell carriers 2, then at the time of arriving at the lot sorter 68 this single shell carrier 2 is to be moved from the guiding rail 6 into the corresponding sorter compartment 680 for that lot. By way of example, the next single shell carrier 2 arriving at the lot sorter 68 may carry a primary packaging shell 3 containing in its cavity 33 a soft contact lens of that lot that is stored in the uppermost sorter compartment 680, and this uppermost sorter compartment 680 does not yet contain the predetermined number (here: four) shell carriers 2. In such instance, this next single shell carrier 2 arriving at the lot sorter 68 is to be moved from the guiding rail 6 into the uppermost sorter compartment 680 of lot sorter 68. To achieve this, the uppermost sorter compartment 680 is moved with the aid of lifting mechanism 681 to the level of the guiding rail 6. A sorter wall actuator 683 then lifts a lateral sorter wall portion 684 to allow a sorter pusher 685 to push the single shell carrier 2 with the primary packaging shell 3 arranged thereon into the empty space of the uppermost sorter compartment 680. To keep that same space in each sorter compartment 680 empty until the sorter compartment 680 contains the predetermined number of (here: four) single shell carriers 2, a further sorter pusher 686 is arranged to push the single shell carrier 2 that has been moved into the empty space of the respective sorter compartment 680 towards a downstream end of the respective sorter compartment 680.

By contrast, in case the next single shell carrier 2 to arrive at the lot sorter 68 carries a primary packaging shell 3 in the cavity 33 of which is contained a contact lens of a lot for which the corresponding sorter compartment 680 already contains four single shell carriers 2, then this single shell carrier 2 cannot to be moved into the corresponding sorter compartment 680 (as there is no empty space in this compartment 680). Rather, the four single shell carriers 2 stored in the sorter compartment 680 of the lot sorter 68 are then pushed out of the sorter compartment 680 back on the guiding rail 6 with the aid of a further sorter pusher 689 after lifting lateral sorter wall portion 684 with the aid of lifting lateral sorter wall actuator 683 and after lifting a further lateral sorter wall portion 688 with the aid of a further sorter wall actuator 687. These four single shell carriers 2 pushed out of sorter compartment 680 back on the guiding rail 6 (see FIG. 7) together with the next single shell carrier 2 arriving at the lot sorter 68 then forms a single shell carrier block of five single shell carriers 2. At the time this next single shell carrier 2 actually arrives at the lot sorter 68 (by being pushed downstream by the queue of single shell carriers 2 arranged on the guiding rail 6), a shell carrier block transportation mechanism 69 (to be described in more detail) engages that single shell carrier 2 arriving at the lot sorter 68 and moves the shell carrier block 5 of five single shell carriers 2 (the four single shell carriers 2 pushed out of the sorter compartment 680 and that single shell carrier 2 arriving at the lot sorter 68) downstream the discharge track 7 at least to a downstream position such that the four positions on the guiding rail 6 corresponding to the four positions in the sorter compartments 680 of the lot sorter 68 are empty again, as this is shown in FIG. 6.

Thereafter (with the four positions on the guiding rail 6 being empty again), depending on whether the next single shell carrier 2 arriving at the lot sorter 68 carries a primary packaging shell 3 containing a contact lens of a lot for which the corresponding compartment 680 already contains four single shell carriers 2 or contains less than four single shell carriers 2, either the four single shell carriers 2 are moved out of the sorter compartment 680 of the lot sorter 68 back on the guiding rail 6 to form a single shell carrier block of five single shell carriers 2 (together with the next single shell carrier 2 arriving at the lot sorter 68 once this single shell carrier 2 has been pushed forward by the queue of single shell carriers 2 on the guiding rail 6) so as to be moved to a position downstream of the lot sorter by the shell carrier block transportation mechanism 69. Or the next single shell carrier 2 arriving at the lot sorter 68 is moved from the guiding rail 6 into the corresponding sorter compartment 680 of lot sorter 68, as this has been described above.

Figure 9:
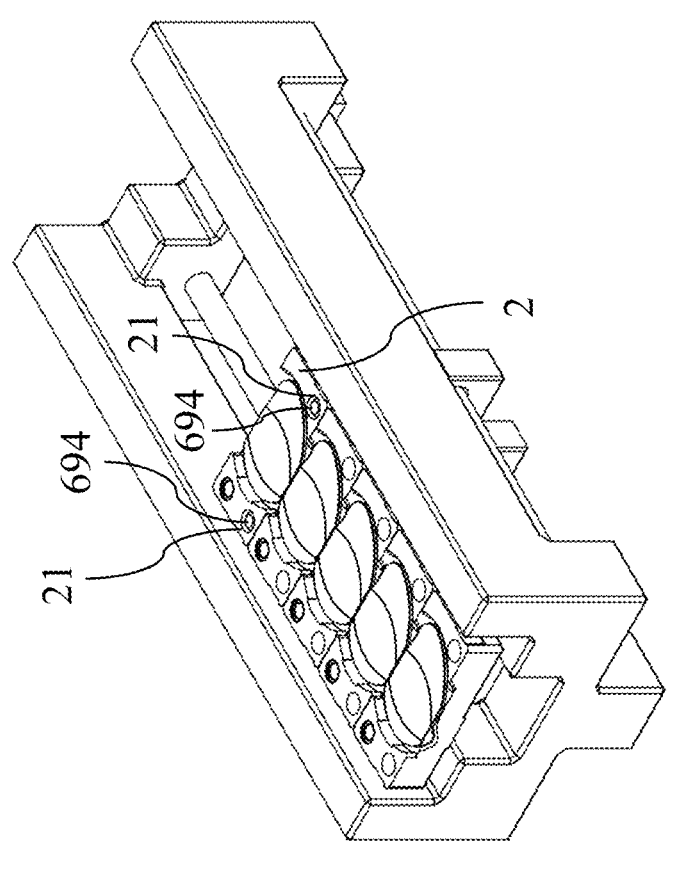
FIG. 9 shows a perspective view of the shell carrier block transportation mechanism with single shell carriers arranged thereon.
Figure 8:
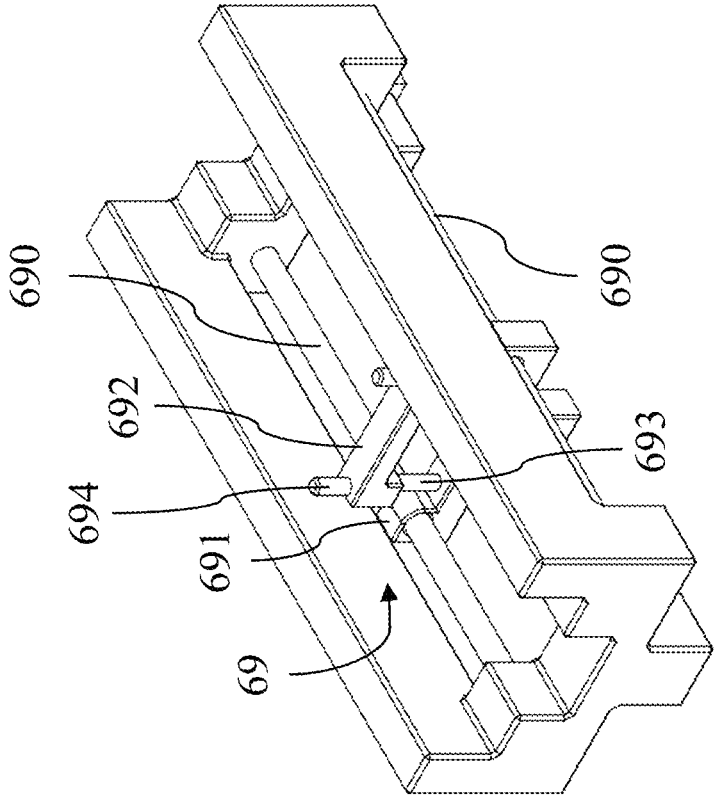
FIG. 8 shows a perspective view of a shell carrier block transportation mechanism.

The shell carrier block transportation mechanism 69 is schematically shown in FIG. 8 and FIG. 9. Shell carrier block transportation mechanism 69 comprises two guiding rods 690 and a carriage 691 which—as a whole—is movable along the guiding rods 690. Carriage 691 comprises a bracket 692 which is movable up and down along two guiding pins 693 (only one of them being visible). Bracket 692 comprises two engagement pins 694 protruding upwardly to allow for engaging/disengaging corresponding through-holes 21 provided in the single shell carrier 2 (see also FIG. 4).

Once four single shell carriers 2 carrying primary packaging shells 3 have been pushed out of a sorter compartment 680 of lot sorter 68 and together with the next single shell carrier 2 arriving at the lot sorter 68 form a shell carrier block of five single shell carriers 2, bracket 692 of carriage 691 is moved upwards so that the engagement pins 694 of bracket 692 engage the through-holes 21 provided in that single shell carrier 2 arriving at the lot sorter (the most upstream single shell carrier 2 of the shell carrier block of five single shell carriers 2, i.e. the last single shell carrier 2 of the shell carrier block). The carriage 691 then moves this shell carrier block of five single shell carriers 2 in a direction downstream of the lot sorter 68 such that the four positions on the guiding rail 6 corresponding to the four positions in the compartments 680 of the lot sorter 68 are empty again (as shown in FIG. 6).

By that movement of the shell carrier block of five single shell carriers 2 those single shell carriers 2 arranged further downstream of this shell carrier block are moved along the discharge track 7 towards the sealing device 70.

Sealing device 70 is arranged along the discharge track 7 (and in any event sealing device 70 is arranged downstream of lot sorter 68) as only shell carrier blocks of single shell carriers 2 having a primary packaging shell 3 arranged thereon containing in its cavity 33 the same lot of soft contact lenses are allowed to arrive at the sealing device 70. This is because the sealing device 70 supplies a sealing foil strip 701 comprising a number of individual sealing foils 702 (here: sealing foil strips 701 comprising five individual sealing foils 702 which are connected to one another to form a said sealing foil strip 701) and seals the individual sealing foils 702 of the sealing foil strip 701 to the top surfaces 32 of the primary packaging shells 3 (see FIG. 4) to form a blister strip 703 of sealed primary packaging shells 3 each containing one soft contact lens of the same lot in its cavity 33.

The particular construction of the sealing device 70 is not the subject of this invention. Sealing device 70 may comprise a foil storage compartment 700 in which the sealing foil strips 701 are stored. As the shell carrier block arrives at the sealing device 70, one such sealing foil strip 701 is placed on the primary packaging shells 3 arranged on the single shell carriers 2 of the shell carrier block such that one individual sealing foil 702 covers the top surface 32 of a corresponding one primary packaging shell 3, and the individual foils are subsequently sealed to the top surfaces 32 of the primary packaging shells to form the blister strip 703 of sealed primary packaging shells 3 (here: five sealed primary packaging shells 3).

After sealing is completed, the shell carrier block with the blister strip 703 of sealed primary packaging shells 3 is further transported down the discharge track 7 to a printing station 71 which is arranged along the discharge track 7 downstream of the sealing device 70. Printing station 71 may be embodied as a laser printing station, and is configured to print data associated with the soft contact lens contained in the cavity 33 of the primary packaging shell 3 to the sealing foil sealed to top surface 32 of the primary packaging shell 3 by the sealing device 70. The printed blister strips 703 of sealed primary packaging shells 3 are then further transported to the distal end of the discharge track 7.

At the distal end of the discharge track 7, a return belt 8 is arranged that extends in a fourth transportation direction 82 transverse to the third transportation direction 62 and back to a proximal end of the supply belt 4. The purpose of the return belt 8 is to return the empty single shell carriers 2 of the shell carrier block to a proximal end of the supply belt 4.

Along the return belt 8, storage magazines 80 are arranged for accommodating the printed blister strips 703 of sealed primary packaging shells 3. A blister strip placement robot 83 is arranged at the downstream end of discharge track 7, and the blister strip placement robot 83 is configured to place the blister strip 703 of sealed primary packaging shells 3 into the respective storage magazine 80 in which blister strips 703 only of that lot of soft contact lenses are contained. That is, all blister strips 703 of sealed primary packaging shells 3 contained in the same storage magazine 80 contain the same lot (and only one lot) of soft contact lenses. Since in the embodiment shown the primary packaging line 1 is configured for four different lots of soft contact lenses by way of example, four such storage magazines 80 are arranged along the return belt 8.

As the shell carrier block with the sealed blister strip 703 arranged thereon arrives at the distal end of discharge track 7, blister strip placement robot 83 reads the unique shell carrier identifiers 20 of the single shell carriers 2 of the shell carrier block and thus knows which lot of soft contact lenses are contained in the cavities 33 of the primary packaging shells 3 of this sealed blister strip 703. Blister strip placement robot 83 then picks the sealed blister strip 703 from the shell carrier block of single shell carriers 2 and places the blister strip 703 into that magazine 80 in which the blister strips 703 containing this particular lot of soft contact lenses are stored. To pick the sealed blister strip 703 up and place it into the respective storage magazine 80, blister strip placement robot 83 may comprise a number of suction cups 830 (e.g. five such suction cups, corresponding to the number of primary packaging shells 3 of the blister strip 703). The empty single shell carriers 2 of the shell carrier block are then pushed on the return belt 8 with the aid of a pusher 72 arranged at the end of discharge track 7 and are returned to the proximal end of the supply belt 4 by return belt 8.

As has been described further above, the number of single shell carriers 2 (here: five) forming a shell carrier block carrying the primary packaging shells 3 which are to be sealed to form a sealed blister strip may vary. While in the embodiment described this number is five, it is conceivable to have any other number of primary packaging shells 3 form a blister strip. For example, the shell carrier block may comprise six single shell carriers 2 each carrying a primary packaging shell 3. Two sealing foil strips each comprising three individual sealing foils may then be placed on the six primary packaging shells 3 and sealed to the top surfaces thereof to concurrently form two sealed blister strips each comprising three primary packaging shells 3.

As a consequence, a shell carrier block comprising six single shell carriers 2 then arrives at the distal end of discharge track 7.

In such instance, blister strip placement robot 83 is configured to concurrently handle the respective number of blister strips arriving at the distal end of discharge track 7. To be capable of returning six single shell carriers 2 to the proximal end of supply belt 4, return belt 8 is arranged beneath a return track that comprises lateral guide walls for guiding the shell carrier blocks (in this case comprising six single shell carriers 2). At least one of these lateral guide walls 81 is laterally movable in a direction transverse to the fourth transportation direction 82, thus allowing for adjustment of the lateral width of the return track and rendering the return track capable of guiding shell carrier blocks of different lengths.

As is evident from the discussion of the primary packaging line 1 above, supply belt 4 has a length that is sufficient to form a buffer so that at different locations on supply belt 4 single shell carriers 2 with or without primary packaging shells 3 arranged thereon may form a queue without affecting the operability of the primary packaging line 1. This is already clear for the transfer of the single shell carrier 2 arranged most downstream at the downstream end 40 of supply belt 4 to the compartment 51 of singling conveyor belt 5, however, it will become clear, too, from the description of the insertion station 41 at which the single shell carriers 2 ejected by the ejector 67 (and carrying an empty primary packaging shell 3) are inserted into the flow of single shell carriers 2 on the supply belt 4.

With respect to the shell carrier ejector 67, it has been discussed above that in case the ophthalmic article presence check unit 65 has determined that a particular single shell carrier 2 has a primary packaging shell 3 arranged thereon the cavity 33 of which contains a number of soft contact lenses different from one (e.g. no soft contact lens or two soft contact lenses), then at the removal station 66 the content (i.e. soft contact lens and storage solution) of cavity 33 of this primary packaging shell 3 is removed (e.g. sucked) from cavity 33, and the single shell carrier 2 with the empty primary packaging shell 3 arranged thereon is then ejected from the guiding rail 6 by the shell carrier ejector 67 (i.e. that single shell carrier 2 is ejected from the queue of single shell carriers 2 that is moved along the guiding rail 6 in the third transportation direction 62), as this is indicated by arrow 670 in FIG. 2. The ejected single shell carrier 2 with the empty primary packaging shell 3 arranged thereon is then returned to the insertion station 41 with the aid of an ejected shell carrier return belt 671 along an ejected shell carrier return track comprising lateral walls 672 for guiding the ejected single shell carrier 2 during its return to the insertion station 41.

Insertion station 41 and the process of inserting a returned ejected single shell carrier 2 will be explained in the following. It is noteworthy in this regard, that typically the empty primary packaging shell 3 remains arranged on the returned ejected single shell carrier. Only in case it has been detected that a particular primary packaging shell 3 has been re-used a predetermined number of times, not only the content of the cavity of that particular primary packaging shell 3 may be removed at the removal station 66, but rather that particular primary packaging shell as a whole is removed to avoid too high a possible bioburden on a primary packaging shell 3. However, the routine scenario is that the empty primary packaging shell 3 is still arranged on the single shell carrier 2 that is returned.

FIG. 10-FIG. 22 show top views of the insertion station 41 arranged along the supply belt 4 (only indicated in FIG. 10 by dashed lines, but not in FIG. 11-FIG. 22), for inserting an ejected single shell carrier 2, at various states of the insertion station 41, in order to illustrate the insertion operation. At an initial state of the insertion station 41 shown in FIG. 10, a single shell carrier 2 (labelled by an 'A' in a circle) is clamped by a first clamping member 410, so that the clamped single shell carrier 2 is unable to move further along the direction indicated by arrow 670. For the sake of simplicity of the drawing, no empty primary packaging shell 3 is shown as being arranged on that single shell carrier 2 (as described above, there are two different scenarios, one in which a primary packaging shell 3 is arranged on the ejected and returned single shell carrier 2, and another one in which the primary packaging shell 3 has been removed from the ejected and returned single shell carrier 2). An alignment member 411 assists in the proper insertion of the clamped single shell carrier 2 (with or without a primary packaging shell 3 arranged thereon) during the insertion operation.

Figure 10:
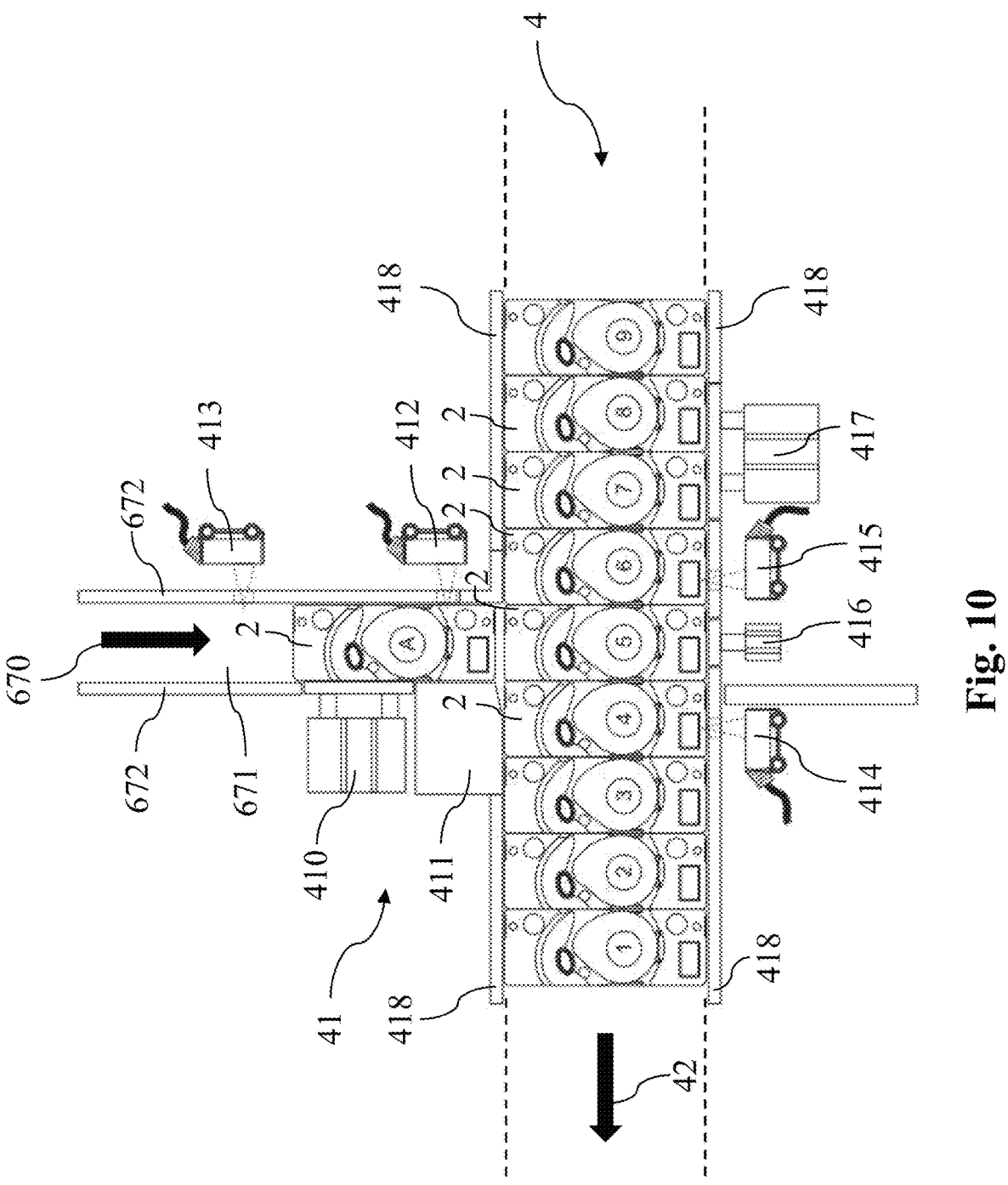
FIGS. 10-22 show top views of the insertion station arranged along the supply belt, for inserting an ejected single shell carrier at various states, for illustrating the insertion operation.

Also shown in FIG. 10 is a queue of single shell carriers 2 (labelled '1' to '9' in a circle) which are transported by supply belt 4 in the first transportation direction 42 towards the downstream end 40 of supply belt 4. A first insertion station sensor 412 detects that there is a (clamped) returned single shell carrier 2 waiting at the insertion station 41. A second insertion station sensor 413 indicates that there is no further single shell carrier 2 waiting at the insertion station 41.

Further, from FIG. 10 it can be seen that a third insertion station sensor 414 is arranged along the supply belt 4 at a location downstream of the location of insertion of the (clamped) single shell carrier 2 (labelled 'A' in a circle), i.e. at the location of single shell carrier 2 labelled '4' in a circle. Yet further, a fourth insertion station sensor 415 is arranged along the supply belt 4 at a location upstream of the location of insertion of the (clamped) single shell carrier 2 (labelled 'A' in a circle), i.e. at the location of single shell carrier 2 labelled '6' in a circle. And still further, a second clamping member 416 is arranged along the supply belt at the location of insertion of the clamped single shell carrier 2 into the queue of single shell carrier 2 on the supply belt 4 (i.e. at the location of single shell carrier labelled '5' in a circle). And finally, a third clamping member 417 is arranged along the supply belt 4 upstream of the location of insertion and also upstream of the fourth insertion station sensor 415 (in FIG. 8 at the location of the single shell carriers 2 labelled '7' and '8'). A retainer bar 419 is arranged so as to not affect the transportation of the single shell carriers 2 arranged on supply belt 4.

As long as this initial state does not change (i.e. as long as no further single shell carrier 2 is returned by the ejected carrier return belt 671), no insertion process is triggered and the 'clamped' single shell carrier 2 (labelled 'A' in a circle) remains waiting at the insertion station 41. The insertion process is triggered only at the time a further single shell carrier 2 is ejected by the shell carrier ejector 67 and returned to the insertion station 41 by the ejected shell carrier return belt 671.

Figure 11:
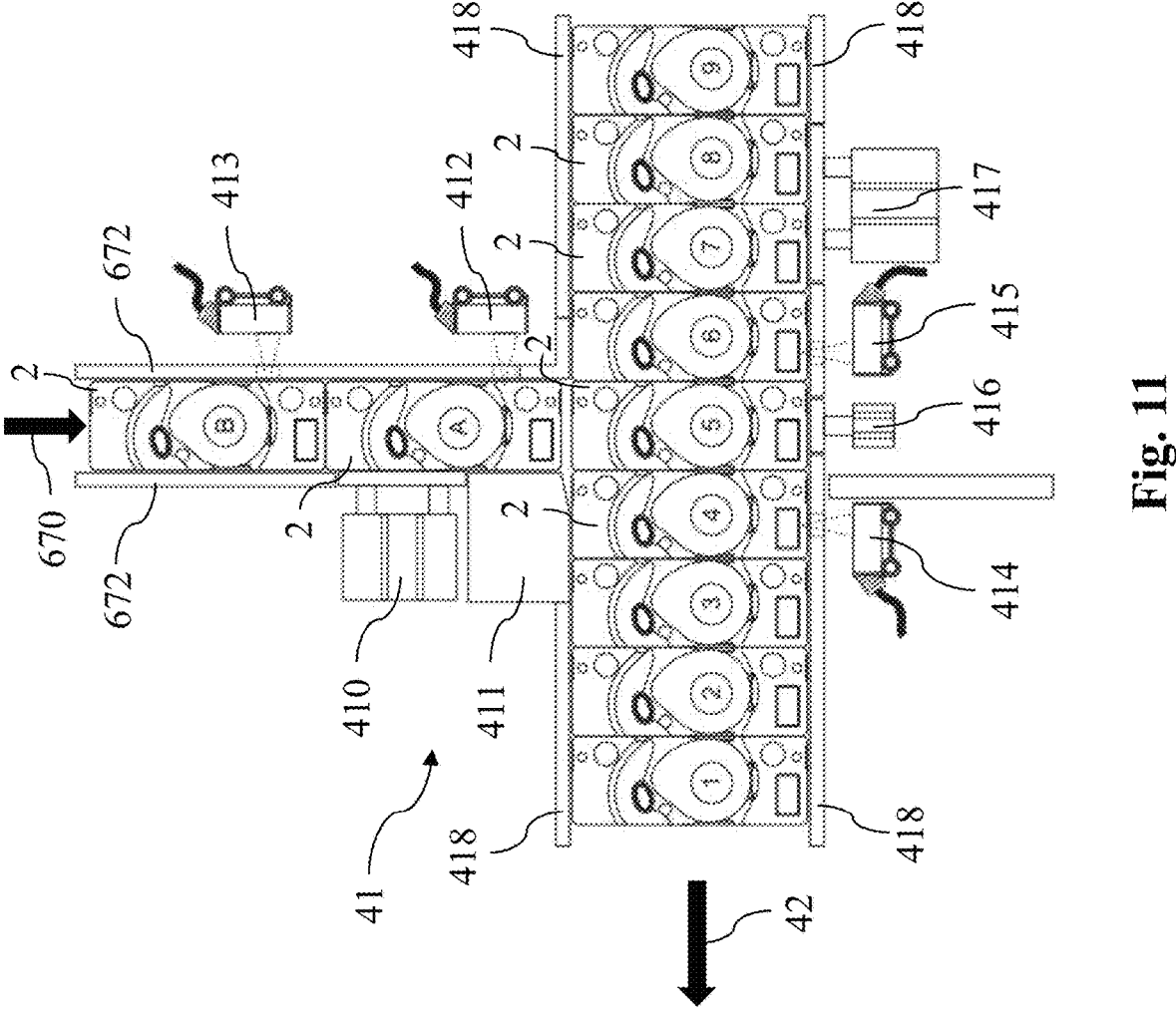

This situation is shown in FIG. 11, in which a further ejected single shell carrier 2 (labelled 'B' in a circle) arrives at the insertion station 41 and abuts against the back end of the clamped single shell carrier 2 (labelled 'A' in a circle) waiting at the insertion station 41. Except for the additional further ejected single shell carrier 2 (labelled 'B' in a circle) and the omitted supply belt 4, FIG. 11 corresponds to FIG. 10. However, as mentioned, the further ejected single shell carrier 2 (labelled 'B' in a circle) triggers insertion of the clamped single shell carrier 2 (labelled 'A') into the queue of single shell carriers 2 arranged on the supply belt (and labelled '1'-'9' in a circle).

Figure 12:
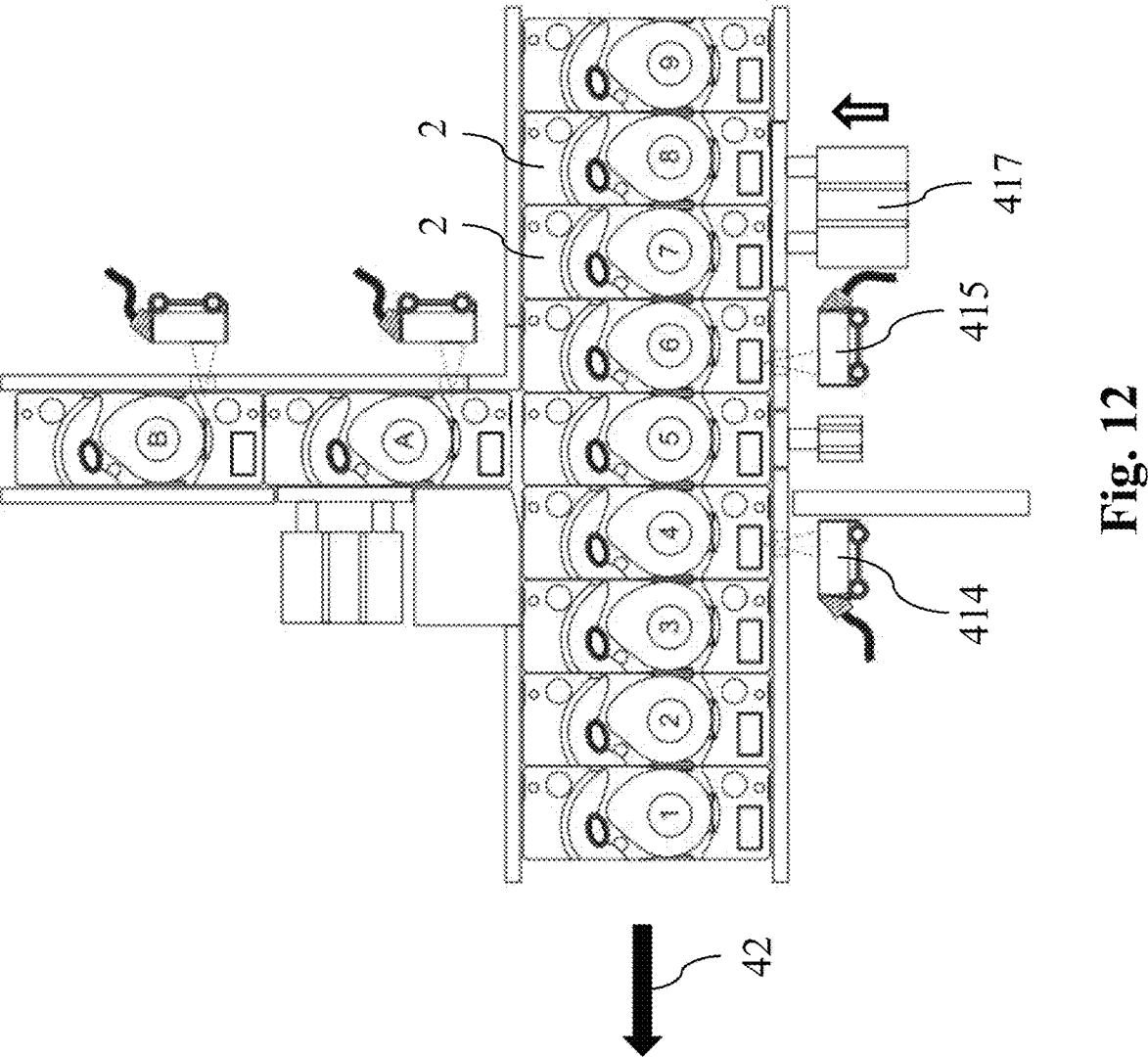

In the next state shown in FIG. 12, the only thing that has changed is that the third clamping member 417 has been moved inwardly (upwards in FIG. 12, see the arrow shown in FIG. 12) so as to clamp two single shell carriers 2 (those labelled '7' and '8' in a circle) arranged in the queue of single shell carriers 2 on the supply belt 4 at a location upstream of the location where the returned and clamped single shell carrier 2 (labelled 'A' in a circle) is waiting for its insertion into the queue.

Thus, although the supply belt 4 continues to move in the first transportation direction 42, the two clamped single shell carriers 2 (those labelled '7' and '8' in a circle) and those arranged upstream thereof (that one labelled '9' in a circle) are not moved in the direction of transportation. Accordingly, as the supply belt 4 has further moved the single shell carriers 2 upstream of the two clamped single shell carriers 2 by the width of one single shell carrier 2, the first single shell carrier of the queue shown in FIG. 12 (that single shell carrier labelled '1') is no longer visible in FIG. 13. In addition, a gap 44 is generated between those single shell carriers 2 arranged on the supply belt 4 downstream of the clamped two single shell carriers 2 (those labelled '2' to '6') arranged in the queue upstream of the location of insertion and the two clamped single shell carriers 2 (labelled '7' and '8'). This gap 44 is detected by the fourth insertion station sensor 415, while the third insertion station sensor 413 still detects no gap (as the width of the gap 44 does not extend that far yet).

Figure 13:
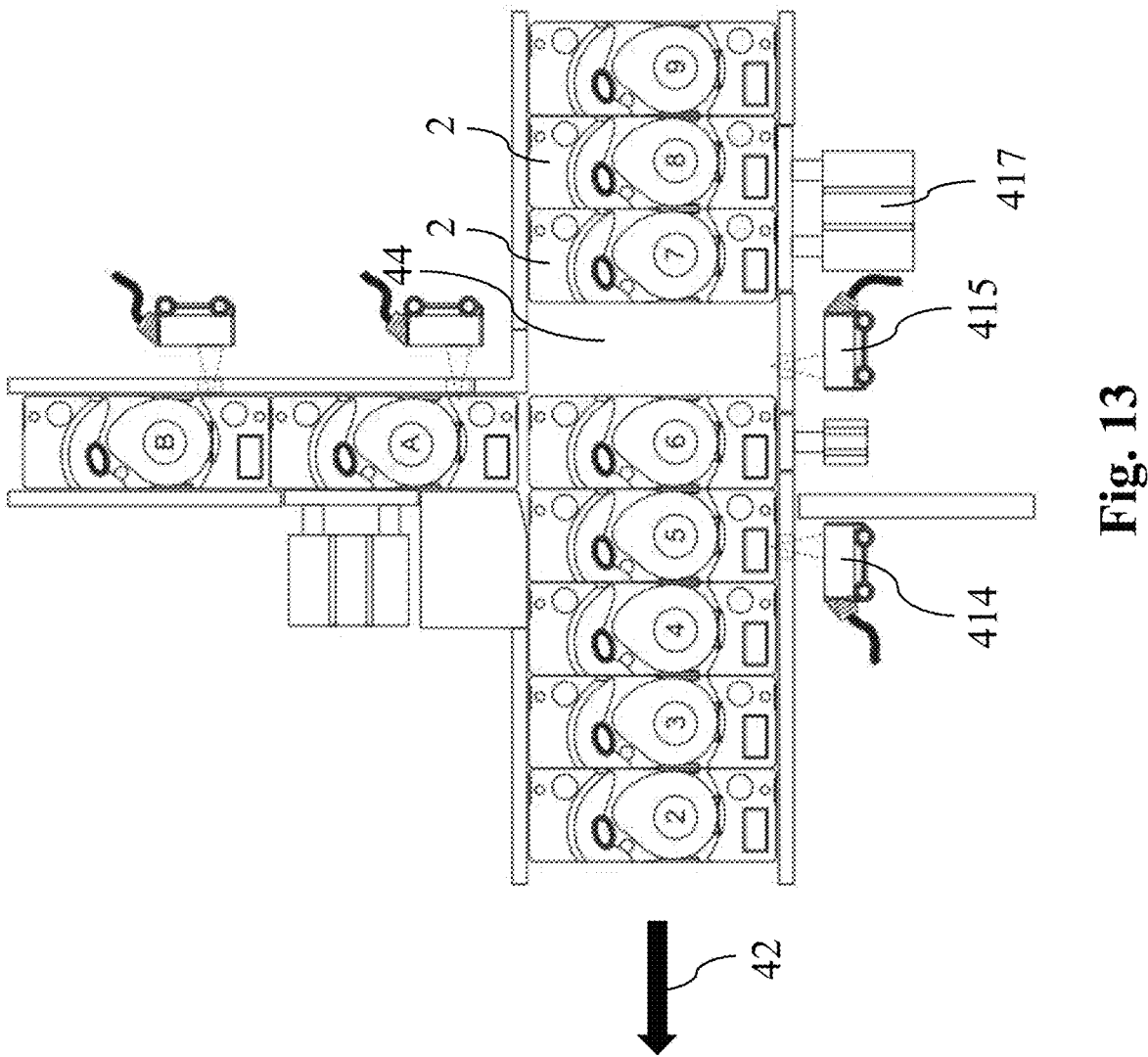
Figure 14:
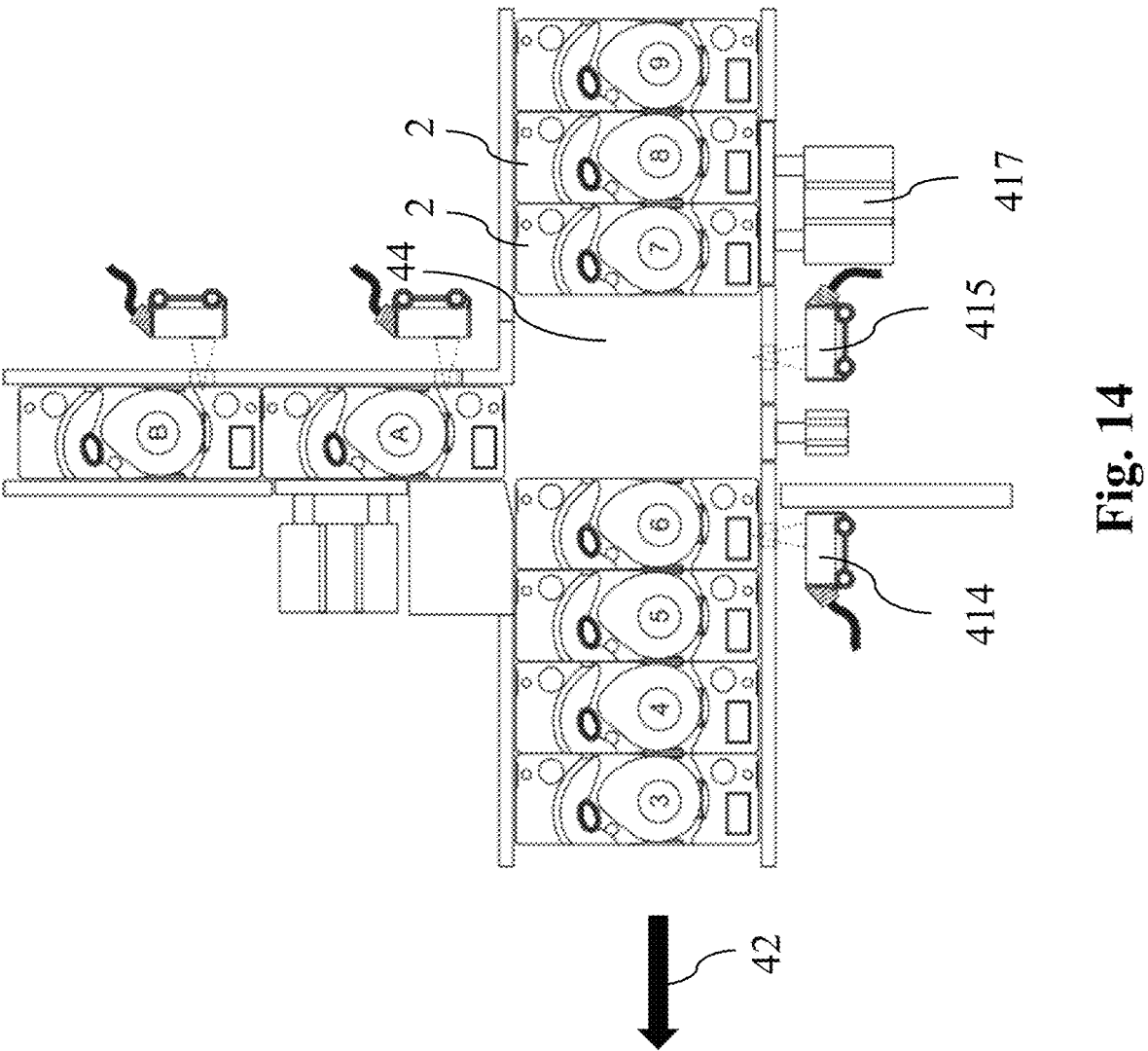

The supply belt 4 continues to move in the first transportation direction 42 while nothing else changes, so that once the supply belt has moved again by the width of one single shell carrier 2, the first single shell carrier 2 shown in FIG. 13 (that single shell carrier labelled '2' in a circle) is no longer visible in FIG. 14. The two clamped single shell carriers 2 (those labelled '7' and '8' in a circle) and those arranged upstream thereof (that one labelled '9' in a circle) have not moved. Accordingly, the gap 44 has increased by the width of one single shell carrier 2 and now also spreads over the location at which the returned and clamped single shell carrier 2 (labelled 'A' in a circle) is waiting for its insertion into the queue. The third insertion station sensor 414, however, still does not detect the gap 44 (as the width of the gap 44 still does not extend that far).

Figure 15:
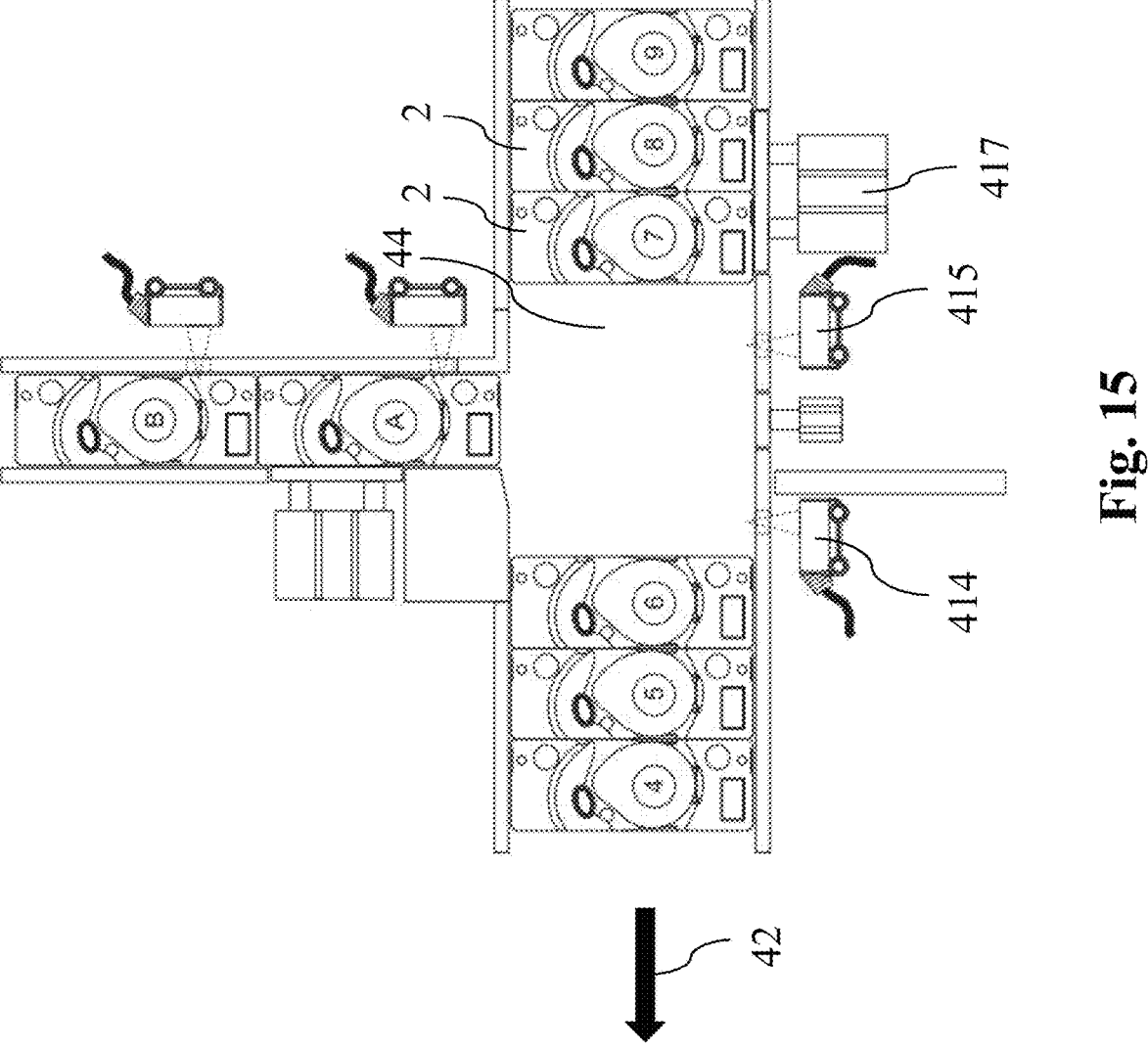

The supply belt 4 then continues to move in the first transportation direction 42 while nothing else changes, so that once the supply belt has moved again by the width of one single shell carrier 2, the first single shell carrier 3 shown in FIG. 14 (that single shell carrier labelled '3' in a circle) is no longer visible in FIG. 15. The two clamped single shell carriers 2 (those labelled '7' and '8' in a circle) and those arranged upstream thereof (that one labelled '9' in a circle) have not moved. Accordingly, the gap 44 has increased again by the width of one single shell carrier 2 and now also spreads over the location where the third insertion sensor is arranged along the supply belt 4. The returned and clamped single shell carrier 2 (labelled 'A' in a circle) is still waiting for its insertion into the queue. However, the third insertion station sensor 414 now detects the gap 44.

Figure 16:
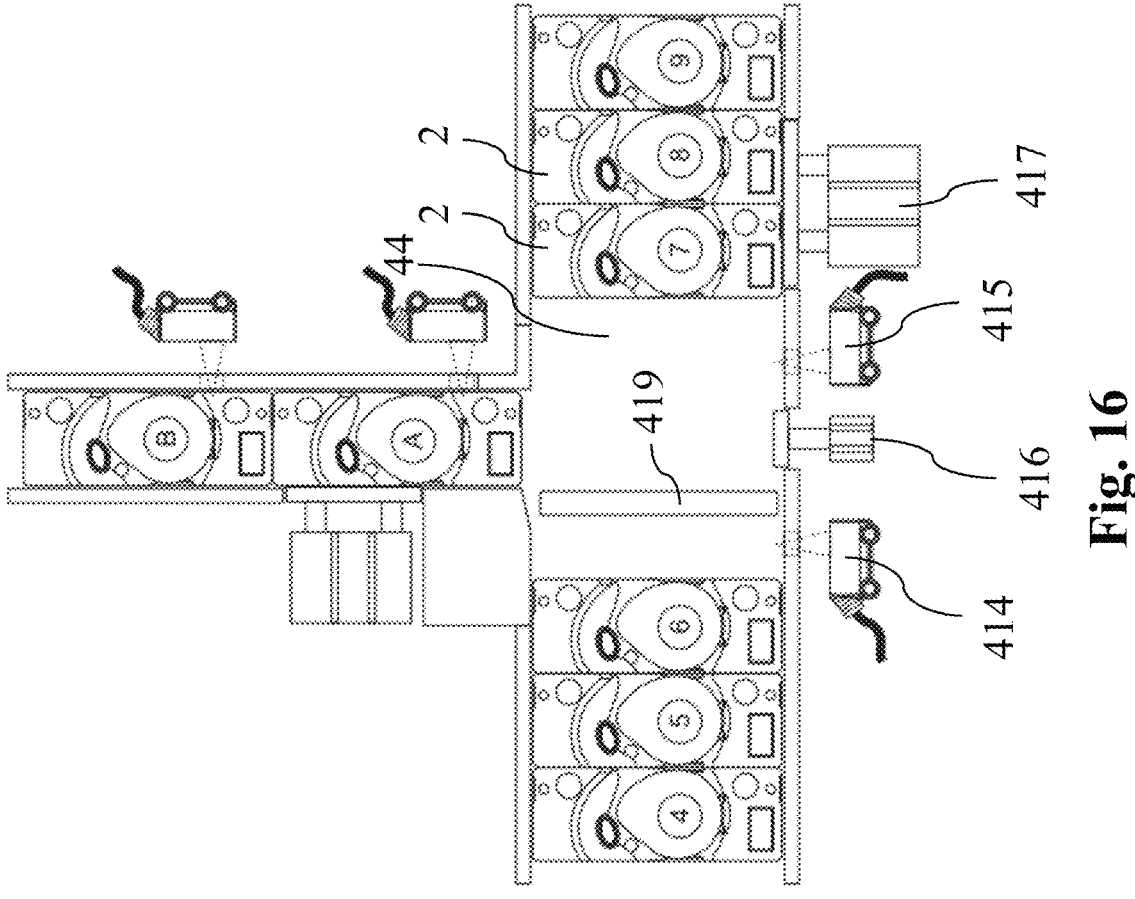

Detection of the gap 44 by the third insertion station sensor 414, as shown in FIG. 15, triggers the next step of the insertion process, this step being represented in FIG. 16. Here, the retainer bar 419 is moved to a location such as to retain any single shell carriers 2 which may arrive at retainer bar 419. In addition, second clamping member 416 is moved inwardly (in FIG. 16 upwardly). Otherwise, there are no changes relative to FIG. 15.

Figure 17:
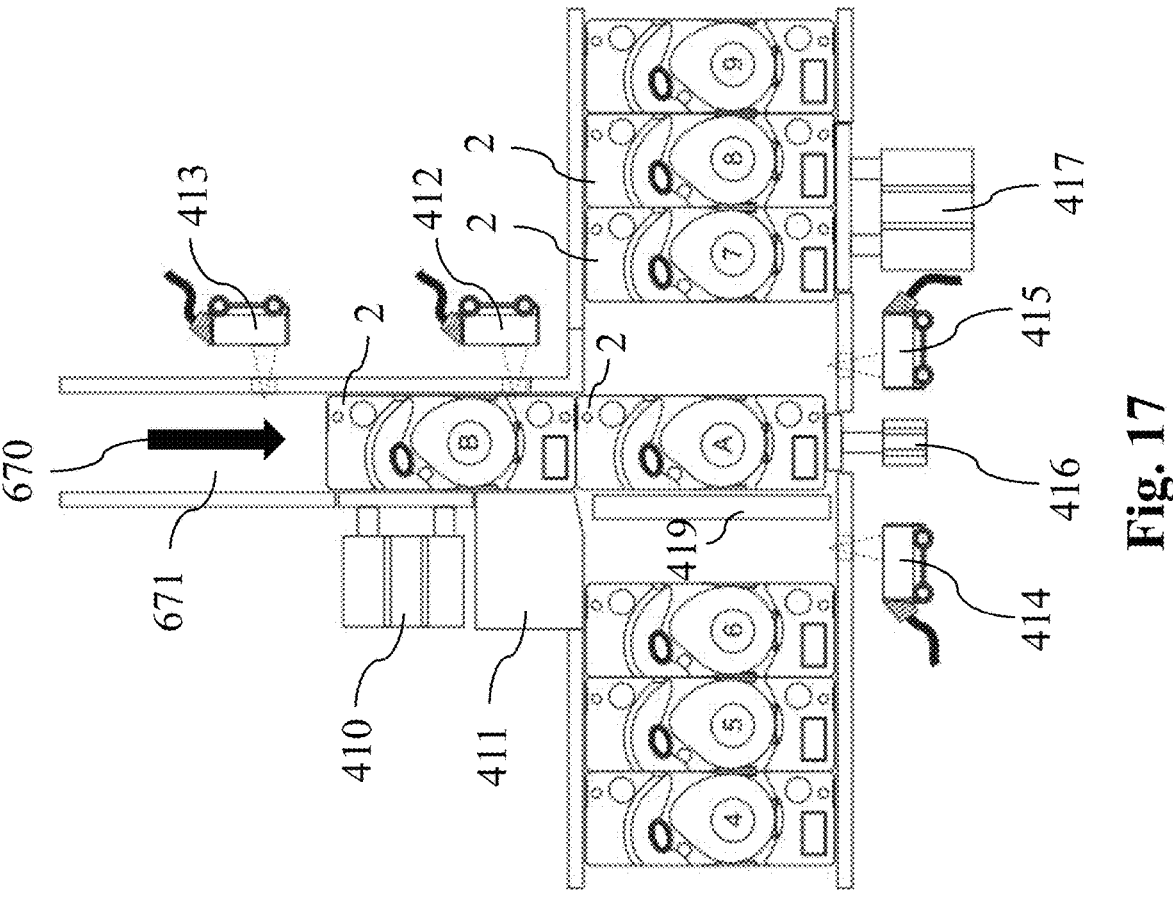

Thereafter, as shown in FIG. 17, first clamping member 410 is moved outwardly, thus releasing the clamped single shell carrier 2 (labelled 'A' in a circle) and allowing the ejected shell carrier return belt 671 to move the clamped single shell carrier 2 (labelled 'A' in a circle) onto the supply belt 4. Alignment member 411 assists in the guided insertion of the single shell carrier 2 (labelled 'A' in a circle) so that the proper orientation of single shell carrier 2 (labelled 'A' in a circle) is maintained during the movement of the single shell carrier 2 (labelled 'A' in a circle) onto the supply belt 4. Concurrently, the ejected and returned single shell carrier 2 (labelled 'B' in a circle) arranged upstream of the inserted single shell carrier 2 (labelled 'A' in a circle) is moved to the previous position of the inserted single shell carrier 2 (see arrow 670). Retainer bar 419 retains the inserted single shell carrier 2 (labelled 'A' in a circle) and does not allow it to be moved by the continuously movable supply belt 4. However, single shell carrier 2 is still slightly displaced inwardly due to the inwardly displaced position of second clamping member 416. Second insertion sensor 413 detects that there is no ejected and returned single shell carrier 2, and as long as this is the case no further single shell carrier insertion occurs.

Figure 18:
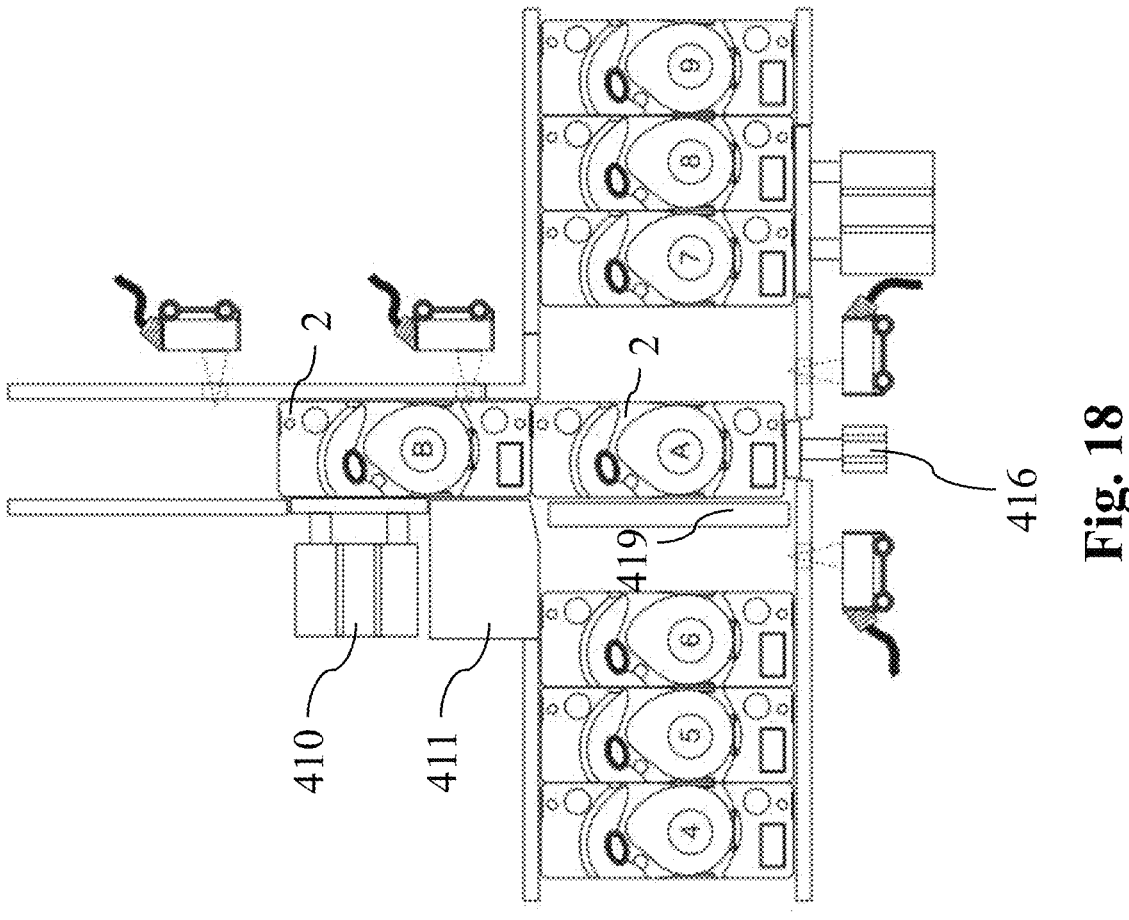

Next, as shown in FIG. 18, the single shell carrier 2 (labelled 'B' in a circle) is clamped again by first clamping member 410. This is done with the inserted single shell carrier 2 still being displaced slightly inwardly (due to the position of the second clamping member 416), so that the front end of the clamped single shell carrier 2 (labelled 'B' in a circle) that abuts against the back end of the inserted single shell carrier 2 (labelled 'A' in a circle) does not interfere with any single shell carriers 2 transported on the supply belt 4. Thus, the clamped single shell carrier 2 (labelled 'B' in a circle) is clamped in the same position as single shell carrier 2 (labelled 'A') is clamped in the initial position (see FIG. 10).

Figure 19:
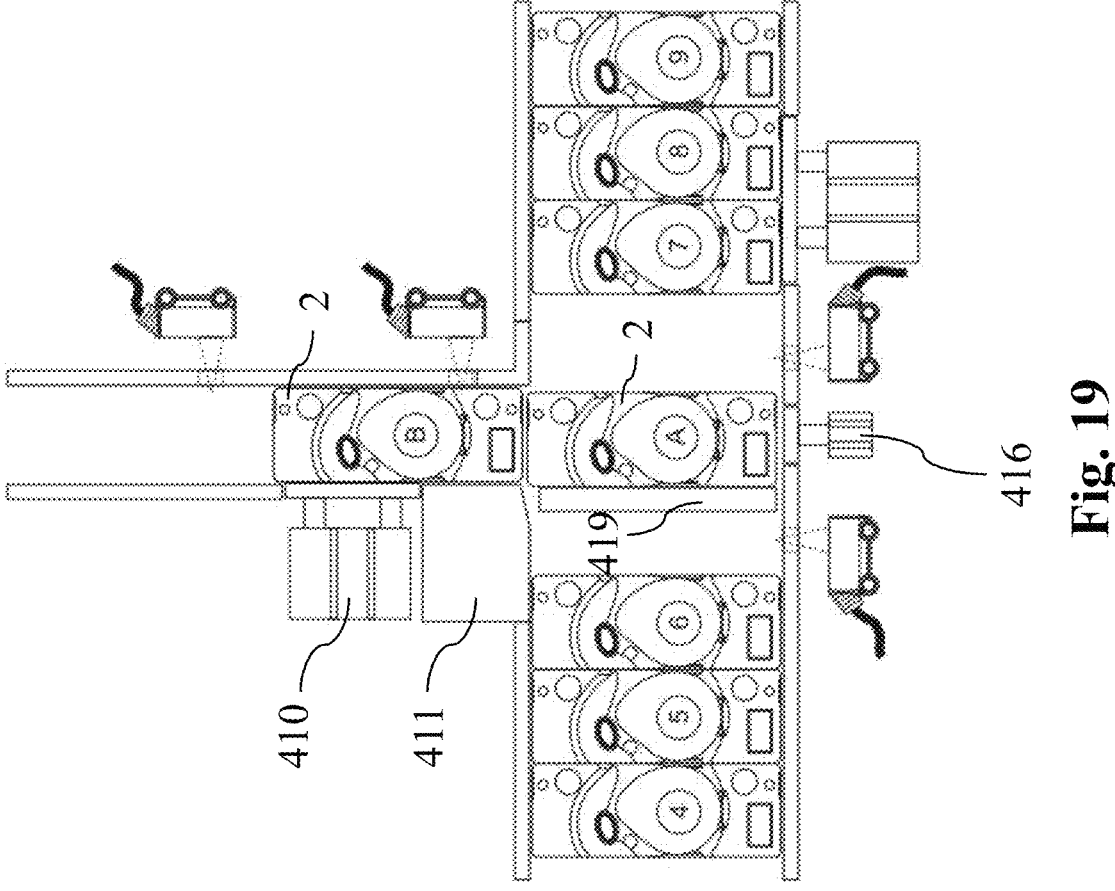

Subsequently, as shown in FIG. 19, second clamping member 416 is moved outwardly again (i.e. downwards in FIG. 17). Otherwise, in FIG. 19 there are no changes compared to FIG. 18.

Figure 20:
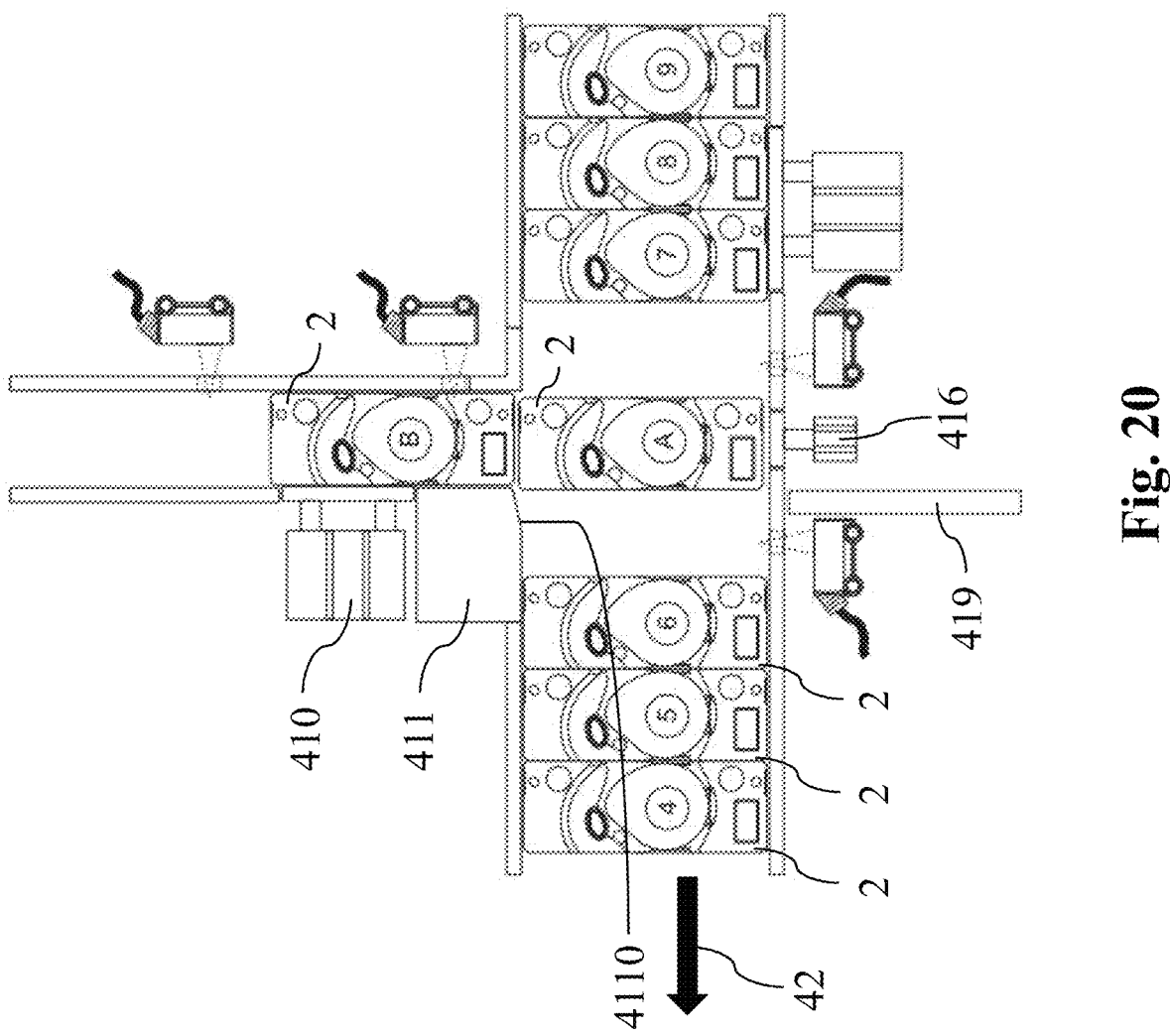

In the next step, shown in FIG. 20, retainer bar 419 is removed again to its initial position, thus allowing the inserted single shell carrier 2 (labelled 'A' in a circle)—arranged on the supply belt 4—to be moved downstream by the supply belt 4. However, as the inserted single shell carrier 2 is still slightly displaced inwardly, during its movement in the first transportation direction 42 it comes into contact with a chamfer 4110 of alignment member 411 which causes alignment of the inserted single shell carrier 2 (labelled 'A' in a circle) with the single shell carriers 2 (labelled '4', '5', and '6' in a circle) arranged downstream.

Figure 21:
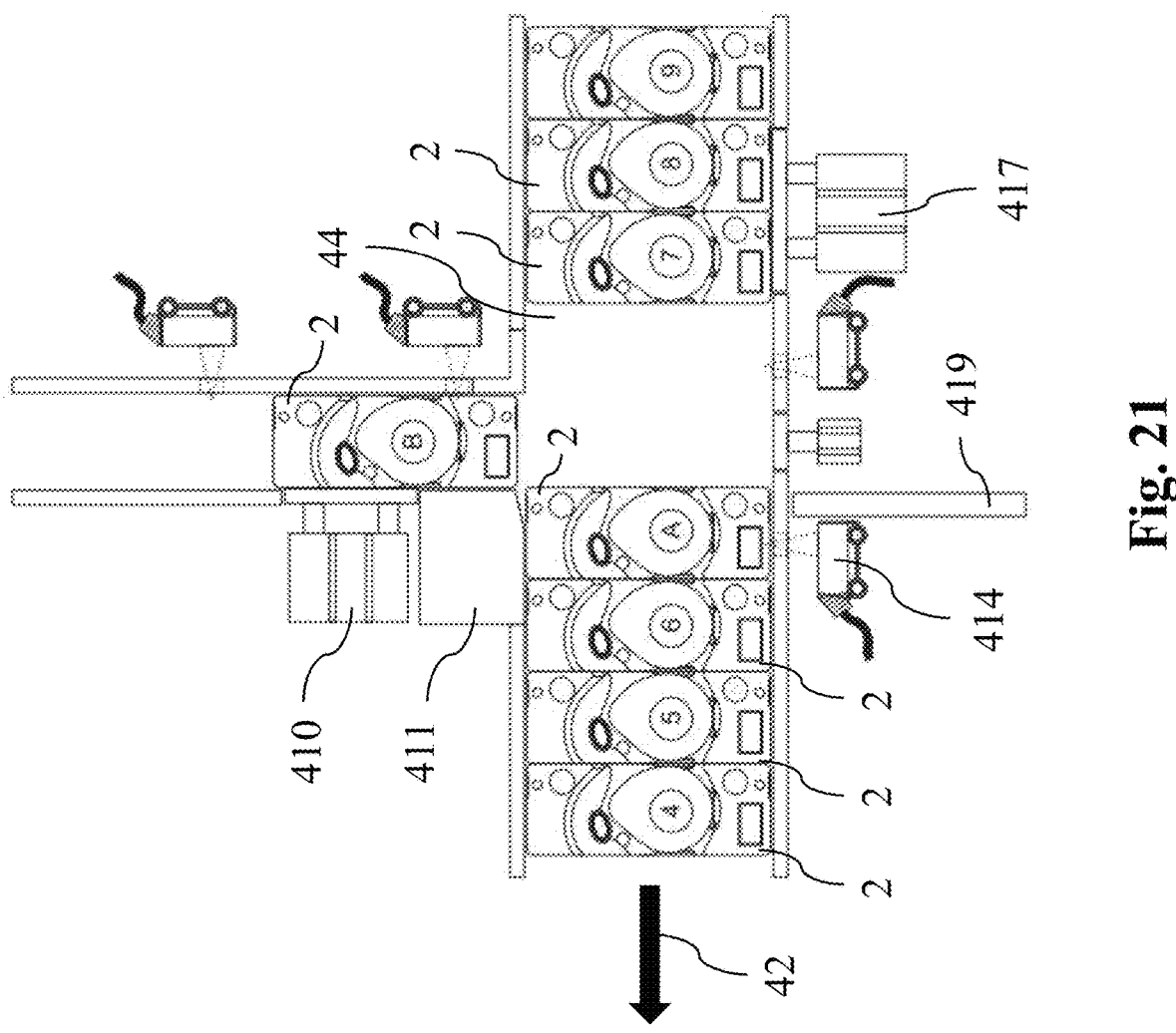
Figure 22:
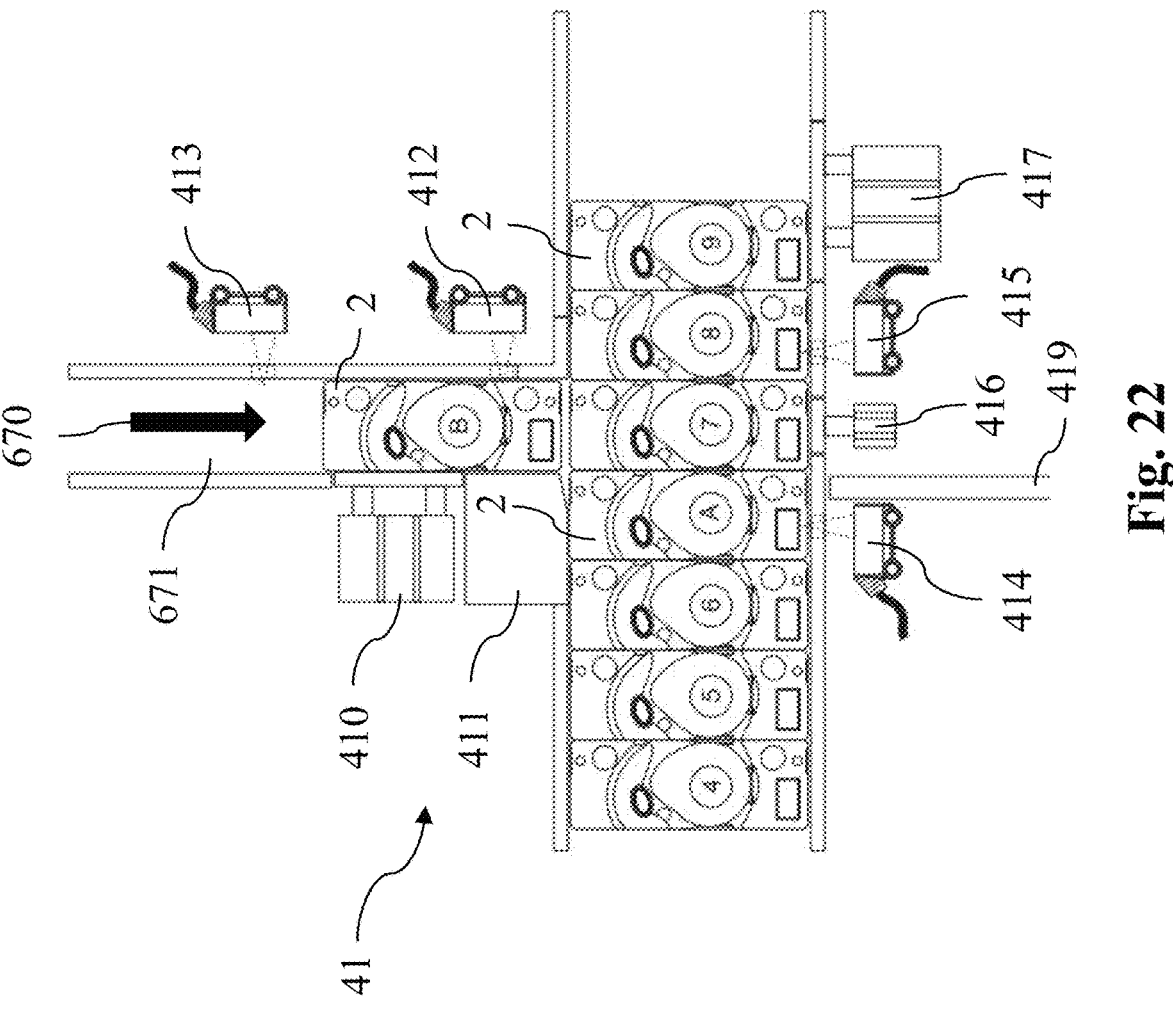

This becomes clear when glancing at FIG. 21, and from FIG. 21 it is furthermore clear that third insertion station sensor 414 then detects the inserted single shell carrier 2 (labelled 'A' in a circle). This is the point in time when the third clamping member 417 is to be moved outwardly again (in FIG. 21 downwards) to release the clamped single shell carriers 2 (labelled '7' and '8' in a circle) which in turn retain the single shell carriers 2 arranged upstream thereof (i.e. that single shell carrier labelled '9'). As a consequence, these single shell carriers 2 are moved in the first transportation direction 42 by the supply belt 4, and the gap 44 is closed again. This final state—after completion of the insertion process—is shown in FIG. 22, and is practically identical with the initial state. The next insertion of an ejected and returned single shell carrier (either with or without a primary packaging shell arranged thereon) may only occur at the time a further single shell carrier is ejected and returned by the ejected shell carrier return belt 671 to the insertion station 41 (see arrow 670).

An embodiment of the primary packaging line according to the invention has been described. However, obviously many changes and modifications may be made without departing from the teaching underlying the instant invention. The scope of protection is therefore defined by the appended claims.

The invention claimed is:

1. Primary packaging line (1) for packaging ophthalmic articles, the primary packaging line comprising:
a plurality of individual single shell carriers (2), each individual single shell carrier (2) configured to carry a single primary packaging shell (3);
a supply belt (4) configured to transport those individual single shell carriers (2) arranged thereon in a first transportation direction (42) to a downstream end (40) of the supply belt (4);
a primary packaging shell placement robot (30) arranged along the supply belt (4) and configured to place a said single primary packaging shell (3) on a said individual single shell carrier (2) arranged on the supply belt (4), so that a primary packaging shell (3) is arranged on each single shell carrier (2) at the downstream end (40) of the supply belt (4);
a cyclically and intermittently movable singling conveyor belt (5) arranged at the downstream end (40) of the supply belt (4) and extending in a direction transverse to the supply belt (4), the singling conveyor belt (5) configured to receive thereon during an actual cycle the single shell carrier (2) which is arranged at the downstream end (40) of the supply belt (4), and further configured to intermittently transport that single shell carrier (2) as well as those single shell carriers (2) received during preceding cycles in a second transportation direction (52) transverse to the first transportation direction (42) towards a downstream end (50) of the singling conveyor belt (5);
a guiding rail (6) arranged at the downstream end of the singling conveyor belt (5) and extending in a direction transverse to the singling conveyor belt (5), the guiding rail (6) configured to receive during the respective actual cycle of the singling conveyor belt (5) that single shell carrier (2) which is arranged at the downstream end (50) of the singling conveyor belt (5), and further configured to guide the received single shell carrier (2) along the guiding rail (6) in a third transportation direction (62) transverse to the second transportation direction (52);
a pusher (60) arranged at the downstream end (50) of the singling shell conveyor belt (5), the pusher configured to push that single shell carrier (2) that is arranged at the downstream end (50) of the singling conveyor belt (5) on the guiding rail (6) during the respective actual cycle of the singling conveyor belt (5), thereby moving those single shell carriers (2) pushed on the guiding rail (6) during preceding cycles in the third transportation direction (62) along the guiding rail (6);
an ophthalmic article placement robot (63) arranged along the guiding rail (6) and configured to place an ophthalmic article into a cavity (33) of the primary packaging shell (3) arranged on the respective single shell carrier (2);
an ophthalmic article presence check unit (65) arranged along the guiding rail (6) downstream of the ophthalmic article placement robot (63) and configured to determine the number of ophthalmic articles present in the cavity (33) of the primary packaging shell (3) arranged on the respective single shell carrier (2);
a shell carrier ejector (67) arranged along the guiding rail (6) downstream of the ophthalmic article presence check unit (65) and configured to eject from the guiding rail (6) a single shell carrier (2) with a primary packaging shell (3) arranged thereon that has been determined by the ophthalmic article presence check unit (65) to contain in its cavity (33) a number of ophthalmic articles different from one;

a lot sorter (68) arranged along the guiding rail (6) downstream of the shell carrier ejector (67) and laterally relative to the guiding rail (6), the lot sorter (68) configured to receive and store the single shell carriers (2) arriving at the lot sorter (68) each carrying a primary packaging shell (3) containing one ophthalmic article in its cavity (33), the lot sorter (68) comprising a plurality of sorter compartments (680) which is at least as high as the number of different lots of ophthalmic articles to be placed by the ophthalmic article placement robot (63) into the cavities (33) of the primary packaging shells (3), the lot sorter (68) further configured to receive and store in each sorter compartment (680) only single shell carriers (2) all carrying a said primary packaging shell (3) containing in its cavity (33) one ophthalmic article of the same lot, the lot sorter (68) further configured to push all single shell carriers (2) stored in the respective sorter compartment (680) out of the respective sorter compartment (680) back on the guiding rail (6) when a predetermined number of single shell carriers (2) is contained in the respective sorter compartment (680) and once a said single shell carrier (2) with a said primary packaging shell (3) containing in its cavity (33) an ophthalmic article of the same lot is expected to arrive at the lot sorter (68);

a shell carrier block transportation mechanism (69) arranged at the lot sorter (6) beneath the guiding rail (6), the shell carrier block transportation mechanism (69) configured to engage a shell carrier block which is formed by the predetermined number of single shell carriers (2) pushed out of the lot sorter compartment (680) on the guiding rail (6) and the next shell carrier (2) arriving at the lot sorter (68), the shell carrier block transportation mechanism (69) further configured to move the shell carrier block on a discharge track (7) extending downstream of the lot sorter (68) in the third transportation direction (62);

a sealing device (70) arranged along the discharge track (7), the sealing device (70) configured to supply a sealing foil strip (701) comprising a number of individual sealing foils (702) connected to one another to form the sealing foil strip (701), the number of individual sealing foils (702) of the sealing foil strip (701) corresponding to the number of single shell carriers (2) of the shell carrier block, the sealing device (70) further configured to seal the individual foils (702) of the sealing foil strip (701) to the top surfaces (32) of the primary packaging shells (3) carried by the shell carriers (2) of the shell carrier block to form a blister strip (703) of sealed primary packaging shells (3) each containing one ophthalmic article of the same lot in the cavity (33) of the respective primary packaging shell (3).

2. Primary packaging line according to claim 1, further comprising a return belt (8) arranged at the distal end of the discharge track (7) and extending in a fourth transportation direction (82) transverse to the third transportation direction (62) to a proximal end of the supply belt (4), for transporting the single shell carriers (2) of the shell carrier block to the proximal end of the supply belt (4) to return them to the supply belt (4);

a number of storage magazines (80) arranged along the return belt (8), each storage magazine (80) configured to accommodate therein a plurality of blister strips (703) of sealed primary packaging shells (3), the number of storage magazines (80) arranged along the return belt (8) being at least as high as the number of different lots of ophthalmic articles;

a blister strip placement robot (83), the blister strip placement robot (83) being configured to place into each of the storage magazines (80) only blister strips (703) of sealed primary packaging shells (3) containing in their cavities (33) the same lot of ophthalmic articles, to allow for a subsequent return of the empty single shell carriers (2) on the return belt (8) to the proximal end of the supply belt (4).

3. Primary packaging line according to claim 2, wherein the return belt (8) is arranged beneath a return track comprising lateral guide walls (81) for guiding the single shell carriers (2) of the shell carrier blocks, at least one of the lateral guide walls (81) being laterally movable in a direction transverse to the fourth transportation direction (82) of movement of the return belt (8), for adjusting the lateral width of the return track so as to be capable of guiding shell carrier blocks of different lengths.

4. Primary packaging line according to claim 1, further comprising an ejected single shell carrier return belt (671) extending from the shell carrier ejector (67) in a fifth transportation direction (670) transverse to the third transportation direction (62) back to a shell carrier insertion station (41) arranged along the supply belt (4) at an insertion location upstream of the primary packaging shell placement robot (43).

5. Primary packaging line according to claim 4, further comprising a retainer (419) arranged along the supply belt (4) at the insertion location, the retainer (419) configured to retain those single shell carriers (2) arranged on the supply belt upstream of the insertion location when an ejected single shell carrier (2) returned to the insertion location by the single shell carrier return belt (671) is to be moved on the supply belt (4).

6. Primary packaging line according to claim 1, wherein the lot sorter (68) comprises the sorter compartments (680) arranged one above the other, and wherein the lot sorter (68) further comprises a lifting mechanism (681) for moving the sorter compartments (680) up and down relative to a level at which the guiding rail (6) is arranged along which the single shell carriers (2) carrying the primary packaging shells (3) containing the different lots of the ophthalmic article arrive at the lot sorter (68), and wherein the lot sorter (68) is configured to move the lifting mechanism (681) such that that sorter compartment (680) is arranged at the level of the guiding rail (6) which is to contain the single shell carriers (2) carrying the primary packaging shells (3) of the particular lot of ophthalmic article actually arriving at the lot sorter (68).

7. Primary packaging line according to claim 1, wherein each of the single shall carriers (2) comprises a shell carrier identifier (20) that is unique for the respective single shell carrier (2), for tracking each individual single shell carrier (2).

8. Primary packaging line according to claim 7, wherein the shell placement robot (43) further comprises a reader for reading out the unique shell carrier identifier (20) present on the single shell carrier (2).

9. Primary packaging line according to claim 3 wherein the blister strip placement robot (83) further comprises a reader for reading out the unique shell carrier identifier (20) present on the single shell carrier (2).

10. Primary packaging line according to claim 1, further comprising a main dosing station (64) arranged along the guiding rail (6) downstream of the ophthalmic article placement robot (63), the main dosing station (64) configured to dose a predetermined main amount of storage solution into the cavity (33) of the primary packaging shell (3) when the shell carrier (2) is arranged at a main dosing location on the guiding rail (6).

11. Primary packaging line according to claim 10, further comprising a pre-dosing station (61) arranged along the guiding rail (6) upstream of the ophthalmic article placement robot (63), the pre-dosing station (61) configured to dose a predetermined initial amount of storage solution into the cavity (33) of the primary packaging shell (3) when the shell carrier (2) is arranged at a pre-dosing location on the guiding rail (6), the initial amount of storage solution being less than forty percent of the total amount of storage solution to be dosed into the cavity (33) of the primary packaging shell (3).

12. Primary packaging line according to claim 1, further comprising a removal station (66) arranged along the guiding rail (6) downstream of the ophthalmic article presence check unit (65) and upstream of the shell carrier ejector (67), the removal station (66) configured to remove at least ophthalmic articles and/or storage solution from the cavity

28

(33) of the primary packaging shell (3) arranged along the single shell carrier (2) in case a primary packaging shell (3) has been determined by the ophthalmic article presence check unit (65) to contain in its cavity (33) a number of ophthalmic articles different from one.

13. Primary packaging line according to claim 7, wherein the removal station (66) is further configured to also remove the primary packaging shell (3) from the single shell carrier (2) in case the shell placement robot (43) has read a said unique shell carrier identifier (20) a predetermined number of times after the single shell carrier (2) with the respective primary packaging shell (3) arranged thereon has been ejected and returned to the supply belt (4).

14. Primary packaging line according to claim 1, further comprising a printing station (71) arranged along the discharge track (7) downstream of the sealing station (70), for printing data associated with the ophthalmic article contained in the cavity (33) of the primary packaging shell (3) to the sealing foil (702) sealed to the primary packaging shell (3) at the sealing station (70).

15. Primary packaging line according to claim 4, wherein the supply belt (4) is arranged beneath a supply track comprising lateral guide walls (45) for guiding the single shell carriers (2) along the supply track, wherein the supply track comprises a buffer section upstream of the shell carrier insertion station (41).

\* \* \* \* \*